(12) United States Patent
Morita

(10) Patent No.: US 6,788,322 B2
(45) Date of Patent: Sep. 7, 2004

(54) IMAGE FORMING APPARATUS THAT ACCURATELY DETECTS SHEET IN THE FEEDING DIRECTION, AND METHOD THEREOF

(75) Inventor: Tetsuya Morita, Kanagawa (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 10/322,368

(22) Filed: Dec. 18, 2002

(65) Prior Publication Data
US 2003/0133002 A1 Jul. 17, 2003

(30) Foreign Application Priority Data

Dec. 18, 2001 (JP) ........................................ 2001-384689
Oct. 25, 2002 (JP) ........................................ 2002-311188

(51) Int. Cl.$^7$ ........................ G03G 15/00; G03G 13/04; G41J 2/385
(52) U.S. Cl. ........................ 347/139; 347/248; 347/262; 399/394; 399/395
(58) Field of Search ................................ 347/139, 234, 347/248, 262; 399/394–395, 1.7, 1.12, 1.18; 400/579; 250/559.29, 559.3, 559.36, 559.37

(56) References Cited

U.S. PATENT DOCUMENTS

| 6,340,984 B1 | * | 1/2002 | Ui et al. ...................... 347/139 |
| 2003/0108372 A1 | * | 6/2003 | Takeda ........................ 399/394 |

FOREIGN PATENT DOCUMENTS

| JP | 8-113391 A | 5/1996 |
| JP | 8-119503 A | 5/1996 |
| JP | 8-230231 A | 9/1996 |
| JP | 9-219776 A | 8/1997 |
| JP | 10/186788 A | 7/1998 |
| JP | 10/293504 A | 11/1998 |
| JP | 10-294833 A | 11/1998 |
| JP | 11-235851 A | 8/1999 |
| JP | 2000-284641 A | 10/2000 |
| JP | 2000-302293 A | 10/2000 |
| JP | 2000-335010 A | 12/2000 |
| JP | 2001-125440 A | 5/2001 |

* cited by examiner

Primary Examiner—Susan Lee
(74) Attorney, Agent, or Firm—Rossi & Associates

(57) ABSTRACT

An image forming apparatus has a CIS disposed in an area where a sheet passes in such a fashion that read pixels of the CIS are arranged in a direction perpendicular to the feeding direction of the sheet. A part of the read pixels (e.g., 1000 pixels) that corresponds to $\frac{1}{7}$ of all the read pixels are repeatedly read with a short period (TS) to detect the position of the leading edge of the sheet being fed. After waiting a predetermined period of time after the timing of detection of the leading edge position of the sheet, a laser beam is irradiated onto a photosensitive drum to start writing an image in the subscanning direction. Further, read pixels (e.g., 6000 pixels) that corresponds to $\frac{6}{7}$ of all the read pixels are repeatedly read with a long period (TL) to detect the position of the side edge of the fed sheet. Based on the detected side edge position of the sheet, the amount of deviation of the sheet is calculated to thereby correct the writing start position in the main scanning direction of the sheet.

25 Claims, 25 Drawing Sheets

FIG. 18

| α \ β | -4 | -3 | -2 | -1 | 0 | 1 | 2 | 3 | 4 |
|---|---|---|---|---|---|---|---|---|---|
| 0.0 | -4.00 | -3.00 | -2.00 | -1.00 | 0.00 | 1.00 | 2.00 | 3.00 | 4.00 |
| 0.5 | -4.00 | -3.00 | -2.00 | -1.00 | 0.00 | 1.00 | 2.00 | 3.00 | 4.00 |
| 1.0 | -4.00 | -3.00 | -2.00 | -1.00 | 0.00 | 1.00 | 2.00 | 3.00 | 4.01 |
| 1.5 | -3.99 | -3.00 | -2.00 | -1.00 | 0.00 | 1.00 | 2.00 | 3.01 | 4.01 |
| 2.0 | -3.99 | -3.00 | -2.00 | -1.00 | 0.00 | 1.00 | 2.00 | 3.01 | 4.01 |
| 2.5 | -3.99 | -3.00 | -2.00 | -1.00 | 0.00 | 1.00 | 2.00 | 3.01 | 4.02 |
| 3.0 | -3.99 | -3.00 | -2.00 | -1.00 | 0.00 | 1.00 | 2.01 | 3.01 | 4.02 |
| 3.5 | -3.99 | -3.00 | -2.00 | -1.00 | 0.00 | 1.00 | 2.01 | 3.02 | 4.02 |
| 4.0 | -3.99 | -3.00 | -2.00 | -1.00 | 0.00 | 1.00 | 2.01 | 3.02 | 4.03 |
| 4.5 | -3.99 | -3.00 | -2.00 | -1.00 | 0.00 | 1.00 | 2.01 | 3.02 | 4.03 |
| 5.0 | -3.99 | -3.00 | -2.00 | -1.00 | 0.00 | 1.01 | 2.01 | 3.03 | 4.04 |
| 5.5 | -3.99 | -3.00 | -2.00 | -1.00 | 0.00 | 1.01 | 2.02 | 3.03 | 4.05 |
| 6.0 | -3.99 | -3.00 | -2.00 | -1.00 | 0.00 | 1.01 | 2.02 | 3.03 | 4.05 |
| 6.5 | -3.99 | -3.00 | -2.00 | -1.00 | 0.00 | 1.01 | 2.02 | 3.04 | 4.06 |
| 7.0 | -4.00 | -3.00 | -2.01 | -1.01 | 0.00 | 1.01 | 2.02 | 3.04 | 4.06 |
| 7.5 | -4.00 | -3.01 | -2.01 | -1.01 | 0.00 | 1.01 | 2.03 | 3.05 | 4.07 |
| 8.0 | -4.00 | -3.01 | -2.01 | -1.01 | 0.00 | 1.01 | 2.03 | 3.05 | 4.08 |
| 8.5 | -4.00 | -3.01 | -2.01 | -1.01 | 0.00 | 1.01 | 2.03 | 3.06 | 4.09 |
| 9.0 | -4.01 | -3.01 | -2.01 | -1.01 | 0.00 | 1.02 | 2.04 | 3.06 | 4.09 |
| 9.5 | -4.01 | -3.02 | -2.02 | -1.01 | 0.00 | 1.02 | 2.04 | 3.07 | 4.10 |
| 10.0 | -4.01 | -3.02 | -2.02 | -1.01 | 0.00 | 1.02 | 2.04 | 3.07 | 4.11 |

FIG. 19

| α | β | | | | | | | | |
|---|---|---|---|---|---|---|---|---|---|
| | -4 | -3 | -2 | -1 | 0 | 1 | 2 | 3 | 4 |
| 0.0 | 0.00 | 0.00 | 0.00 | 0.00 | 0.00 | 0.00 | 0.00 | 0.00 | 0.00 |
| 0.5 | -0.06 | -0.04 | -0.03 | -0.01 | 0.00 | 0.02 | 0.03 | 0.05 | 0.06 |
| 1.0 | -0.11 | -0.08 | -0.05 | -0.02 | 0.00 | 0.05 | 0.08 | 0.11 | 0.14 |
| 1.5 | -0.15 | -0.10 | -0.06 | -0.01 | 0.00 | 0.08 | 0.13 | 0.17 | 0.22 |
| 2.0 | -0.18 | -0.12 | -0.06 | 0.00 | 0.00 | 0.12 | 0.18 | 0.24 | 0.30 |
| 2.5 | -0.21 | -0.13 | -0.06 | 0.02 | 0.00 | 0.17 | 0.25 | 0.32 | 0.40 |
| 3.0 | -0.23 | -0.14 | -0.05 | 0.05 | 0.00 | 0.23 | 0.32 | 0.41 | 0.50 |
| 3.5 | -0.24 | -0.13 | -0.03 | 0.08 | 0.00 | 0.29 | 0.40 | 0.51 | 0.62 |
| 4.0 | -0.24 | -0.12 | 0.00 | 0.12 | 0.00 | 0.37 | 0.49 | 0.61 | 0.73 |
| 4.5 | -0.24 | -0.10 | 0.03 | 0.17 | 0.00 | 0.45 | 0.59 | 0.72 | 0.86 |
| 5.0 | -0.23 | -0.08 | 0.08 | 0.23 | 0.00 | 0.54 | 0.69 | 0.84 | 1.00 |
| 5.5 | -0.21 | -0.04 | 0.13 | 0.29 | 0.00 | 0.63 | 0.80 | 0.97 | 1.14 |
| 6.0 | -0.18 | 0.00 | 0.18 | 0.37 | 0.00 | 0.74 | 0.92 | 1.11 | 1.29 |
| 6.5 | -0.15 | 0.05 | 0.25 | 0.45 | 0.00 | 0.85 | 1.05 | 1.25 | 1.45 |
| 7.0 | -0.11 | 0.11 | 0.32 | 0.54 | 0.00 | 0.97 | 1.18 | 1.40 | 1.62 |
| 7.5 | -0.06 | 0.17 | 0.40 | 0.63 | 0.00 | 1.09 | 1.33 | 1.56 | 1.79 |
| 8.0 | 0.00 | 0.24 | 0.49 | 0.74 | 0.00 | 1.23 | 1.48 | 1.73 | 1.98 |
| 8.5 | 0.06 | 0.32 | 0.59 | 0.85 | 0.00 | 1.37 | 1.64 | 1.91 | 2.17 |
| 9.0 | 0.14 | 0.41 | 0.69 | 0.97 | 0.00 | 1.53 | 1.81 | 2.09 | 2.37 |
| 9.5 | 0.22 | 0.51 | 0.80 | 1.09 | 0.00 | 1.69 | 1.98 | 2.28 | 2.58 |
| 10.0 | 0.30 | 0.61 | 0.92 | 1.23 | 0.00 | 1.86 | 2.17 | 2.49 | 2.80 |

FIG. 21

| α | β | | | | | | | | |
|---|---|---|---|---|---|---|---|---|---|
| | -4 | -3 | -2 | -1 | 0 | 1 | 2 | 3 | 4 |
| 0.0 | -4.00 | -3.00 | -2.00 | -1.00 | 0.00 | 1.00 | 2.00 | 3.00 | 4.00 |
| 0.5 | -3.50 | -2.50 | -1.50 | -0.50 | 0.50 | 1.50 | 2.50 | 3.50 | 4.50 |
| 1.0 | -3.00 | -2.00 | -1.00 | 0.00 | 1.00 | 2.00 | 3.00 | 4.00 | 4.99 |
| 1.5 | -2.50 | -1.50 | -0.50 | 0.50 | 1.50 | 2.50 | 3.50 | 4.49 | 5.49 |
| 2.0 | -2.00 | -1.00 | 0.00 | 1.00 | 2.00 | 3.00 | 3.99 | 4.99 | 5.98 |
| 2.5 | -1.50 | -0.50 | 0.50 | 1.50 | 2.50 | 3.49 | 4.49 | 5.48 | 6.47 |
| 3.0 | -1.00 | 0.00 | 1.00 | 2.00 | 3.00 | 3.99 | 4.98 | 5.98 | 6.97 |
| 3.5 | -0.50 | 0.50 | 1.50 | 2.50 | 3.49 | 4.49 | 5.48 | 6.47 | 7.45 |
| 4.0 | 0.00 | 1.00 | 2.00 | 3.00 | 3.99 | 4.98 | 5.97 | 6.96 | 7.94 |
| 4.5 | 0.50 | 1.50 | 2.50 | 3.49 | 4.49 | 5.48 | 6.46 | 7.45 | 8.43 |
| 5.0 | 1.00 | 2.00 | 3.00 | 3.99 | 4.98 | 5.97 | 6.95 | 7.93 | 8.91 |
| 5.5 | 1.50 | 2.50 | 3.50 | 4.49 | 5.47 | 6.46 | 7.44 | 8.42 | 9.39 |
| 6.0 | 2.00 | 3.00 | 3.99 | 4.98 | 5.97 | 6.95 | 7.93 | 8.90 | 9.87 |
| 6.5 | 2.50 | 3.50 | 4.49 | 5.48 | 6.46 | 7.44 | 8.41 | 9.38 | 10.35 |
| 7.0 | 3.00 | 4.00 | 4.98 | 5.97 | 6.95 | 7.92 | 8.90 | 9.86 | 10.83 |
| 7.5 | 3.50 | 4.49 | 5.48 | 6.46 | 7.44 | 8.41 | 9.38 | 10.34 | 11.30 |
| 8.0 | 4.00 | 4.99 | 5.97 | 6.95 | 7.92 | 8.89 | 9.86 | 10.82 | 11.77 |
| 8.5 | 4.50 | 5.48 | 6.46 | 7.44 | 8.41 | 9.37 | 10.33 | 11.29 | 12.24 |
| 9.0 | 4.99 | 5.98 | 6.95 | 7.92 | 8.89 | 9.85 | 10.81 | 11.76 | 12.71 |
| 9.5 | 5.49 | 6.47 | 7.44 | 8.41 | 9.37 | 10.33 | 11.28 | 12.23 | 13.17 |
| 10.0 | 5.98 | 6.96 | 7.93 | 8.89 | 9.85 | 10.80 | 11.75 | 12.69 | 13.63 |

FIG. 22

| α \ β | -4 | -3 | -2 | -1 | 0 | 1 | 2 | 3 | 4 |
|---|---|---|---|---|---|---|---|---|---|
| 0.0 | 0.00 | 0.00 | 0.00 | 0.00 | 0.00 | 0.00 | 0.00 | 0.00 | 0.00 |
| 0.5 | 0.50 | 0.50 | 0.50 | 0.50 | 0.50 | 0.50 | 0.50 | 0.50 | 0.49 |
| 1.0 | 1.00 | 1.00 | 1.00 | 1.00 | 1.00 | 1.00 | 1.00 | 0.99 | 0.99 |
| 1.5 | 1.50 | 1.50 | 1.50 | 1.50 | 1.50 | 1.50 | 1.50 | 1.49 | 1.48 |
| 2.0 | 1.99 | 2.00 | 2.00 | 2.00 | 2.00 | 2.00 | 1.99 | 1.99 | 1.98 |
| 2.5 | 2.49 | 2.50 | 2.50 | 2.50 | 2.50 | 2.50 | 2.49 | 2.48 | 2.47 |
| 3.0 | 2.99 | 3.00 | 3.00 | 3.00 | 3.00 | 3.00 | 2.99 | 2.98 | 2.96 |
| 3.5 | 3.49 | 3.50 | 3.50 | 3.50 | 3.50 | 3.49 | 3.49 | 3.47 | 3.46 |
| 4.0 | 3.99 | 4.00 | 4.00 | 4.00 | 4.00 | 3.99 | 3.98 | 3.97 | 3.95 |
| 4.5 | 4.50 | 4.50 | 4.50 | 4.50 | 4.50 | 4.49 | 4.48 | 4.46 | 4.44 |
| 5.0 | 5.00 | 5.00 | 5.01 | 5.01 | 5.00 | 4.99 | 4.98 | 4.95 | 4.93 |
| 5.5 | 5.50 | 5.51 | 5.51 | 5.51 | 5.50 | 5.49 | 5.47 | 5.45 | 5.42 |
| 6.0 | 6.00 | 6.01 | 6.01 | 6.01 | 6.00 | 5.99 | 5.97 | 5.94 | 5.91 |
| 6.5 | 6.51 | 6.51 | 6.51 | 6.51 | 6.50 | 6.48 | 6.46 | 6.43 | 6.40 |
| 7.0 | 7.01 | 7.02 | 7.02 | 7.01 | 7.00 | 6.98 | 6.96 | 6.92 | 6.88 |
| 7.5 | 7.52 | 7.52 | 7.52 | 7.51 | 7.50 | 7.48 | 7.45 | 7.41 | 7.37 |
| 8.0 | 8.02 | 8.03 | 8.03 | 8.02 | 8.00 | 7.98 | 7.94 | 7.91 | 7.86 |
| 8.5 | 8.53 | 8.53 | 8.53 | 8.52 | 8.50 | 8.47 | 8.44 | 8.40 | 8.34 |
| 9.0 | 9.04 | 9.04 | 9.03 | 9.02 | 9.00 | 8.97 | 8.93 | 8.88 | 8.83 |
| 9.5 | 9.54 | 9.55 | 9.54 | 9.52 | 9.50 | 9.47 | 9.43 | 9.37 | 9.31 |
| 10.0 | 10.05 | 10.05 | 10.04 | 10.03 | 10.00 | 9.96 | 9.92 | 9.86 | 9.79 |

FIG. 23

| α | β | | | | | | | | |
|---|---|---|---|---|---|---|---|---|---|
| | -4 | -3 | -2 | -1 | 0 | 1 | 2 | 3 | 4 |
| 0.0 | 0.00 | 0.00 | 0.00 | 0.00 | 0.00 | 0.00 | 0.00 | 0.00 | 0.00 |
| 0.5 | -0.02 | -0.09 | -0.07 | -0.02 | 0.00 | -0.07 | -0.29 | -0.73 | -1.44 |
| 1.0 | -0.28 | -0.18 | -0.08 | -0.01 | 0.00 | -0.08 | -0.28 | -0.64 | -1.18 |
| 1.5 | -0.33 | -0.18 | -0.06 | 0.00 | 0.00 | -0.09 | -0.30 | -0.64 | -1.13 |
| 2.0 | -0.32 | -0.16 | -0.04 | 0.02 | 0.00 | -0.11 | -0.33 | -0.66 | -1.14 |
| 2.5 | -0.30 | -0.13 | -0.01 | 0.03 | 0.00 | -0.12 | -0.35 | -0.70 | -1.17 |
| 3.0 | -0.26 | -0.09 | 0.01 | 0.05 | 0.00 | -0.14 | -0.38 | -0.74 | -1.21 |
| 3.5 | -0.21 | -0.05 | 0.04 | 0.06 | 0.00 | -0.15 | -0.41 | -0.78 | -1.26 |
| 4.0 | -0.16 | -0.01 | 0.07 | 0.08 | 0.00 | -0.17 | -0.44 | -0.82 | -1.31 |
| 4.5 | -0.11 | 0.03 | 0.10 | 0.09 | 0.00 | -0.18 | -0.47 | -0.86 | -1.37 |
| 5.0 | -0.06 | 0.07 | 0.13 | 0.11 | 0.00 | -0.20 | -0.50 | -0.91 | -1.42 |
| 5.5 | 0.00 | 0.12 | 0.16 | 0.12 | 0.00 | -0.22 | -0.53 | -0.95 | -1.48 |
| 6.0 | 0.06 | 0.16 | 0.19 | 0.14 | 0.00 | -0.23 | -0.56 | -1.00 | -1.54 |
| 6.5 | 0.11 | 0.20 | 0.22 | 0.15 | 0.00 | -0.25 | -0.59 | -1.04 | -1.60 |
| 7.0 | 0.17 | 0.25 | 0.25 | 0.17 | 0.00 | -0.26 | -0.62 | -1.09 | -1.66 |
| 7.5 | 0.23 | 0.29 | 0.29 | 0.19 | 0.00 | -0.28 | -0.66 | -1.14 | -1.73 |
| 8.0 | 0.29 | 0.34 | 0.31 | 0.20 | 0.00 | -0.29 | -0.69 | -1.18 | -1.79 |
| 8.5 | 0.35 | 0.39 | 0.34 | 0.22 | 0.00 | -0.31 | -0.72 | -1.23 | -1.85 |
| 9.0 | 0.41 | 0.43 | 0.37 | 0.23 | 0.00 | -0.33 | -0.75 | -1.28 | -1.92 |
| 9.5 | 0.47 | 0.48 | 0.41 | 0.25 | 0.00 | -0.34 | -0.79 | -1.33 | -1.99 |
| 10.0 | 0.53 | 0.52 | 0.44 | 0.26 | 0.00 | -0.36 | -0.82 | -1.38 | -2.05 |

FIG. 24

| β | 0 | 0 | 0 | 2 | 2 | 2 | 4 | 4 | 4 |
|---|---|---|---|---|---|---|---|---|---|
| α | -3 | 0 | 3 | -3 | 0 | 3 | -3 | 0 | 3 |
| α1 | -3.00 | 0.00 | 3.00 | -3.00 | 0.00 | 2.99 | -2.99 | 0.00 | 2.98 |
| DETECTION AMOUNT γ1 FOR SKEW AMOUNT γ | 0.05 | 0.05 | 0.05 | 0.05 | 0.05 | 0.05 | 0.04 | 0.05 | 0.07 |
| | 0.10 | 0.10 | 0.10 | 0.10 | 0.10 | 0.10 | 0.09 | 0.10 | 0.12 |
| | 0.15 | 0.15 | 0.15 | 0.15 | 0.15 | 0.15 | 0.14 | 0.15 | 0.17 |
| | 0.20 | 0.20 | 0.20 | 0.20 | 0.20 | 0.20 | 0.19 | 0.20 | 0.22 |
| | 0.25 | 0.25 | 0.25 | 0.25 | 0.25 | 0.25 | 0.24 | 0.25 | 0.27 |
| | 0.30 | 0.30 | 0.30 | 0.30 | 0.30 | 0.30 | 0.29 | 0.30 | 0.32 |
| | 0.35 | 0.35 | 0.35 | 0.35 | 0.35 | 0.35 | 0.34 | 0.35 | 0.37 |
| | 0.40 | 0.40 | 0.40 | 0.40 | 0.40 | 0.40 | 0.39 | 0.40 | 0.42 |
| | 0.45 | 0.45 | 0.45 | 0.45 | 0.45 | 0.45 | 0.44 | 0.45 | 0.47 |
| | 0.50 | 0.50 | 0.50 | 0.50 | 0.50 | 0.50 | 0.49 | 0.50 | 0.52 |
| | 0.55 | 0.55 | 0.55 | 0.55 | 0.55 | 0.55 | 0.54 | 0.55 | 0.57 |
| | 0.60 | 0.60 | 0.60 | 0.60 | 0.60 | 0.60 | 0.59 | 0.60 | 0.62 |
| | 0.65 | 0.65 | 0.64 | 0.65 | 0.65 | 0.65 | 0.64 | 0.65 | 0.67 |
| | 0.70 | 0.70 | 0.69 | 0.70 | 0.70 | 0.70 | 0.69 | 0.70 | 0.72 |
| | 0.75 | 0.75 | 0.74 | 0.75 | 0.75 | 0.75 | 0.74 | 0.75 | 0.77 |
| | 0.80 | 0.80 | 0.79 | 0.80 | 0.80 | 0.80 | 0.79 | 0.80 | 0.82 |
| | 0.85 | 0.85 | 0.84 | 0.85 | 0.85 | 0.85 | 0.84 | 0.85 | 0.87 |
| | 0.90 | 0.90 | 0.89 | 0.90 | 0.90 | 0.90 | 0.89 | 0.90 | 0.92 |
| | 0.95 | 0.95 | 0.94 | 0.95 | 0.95 | 0.95 | 0.94 | 0.95 | 0.96 |
| | 1.00 | 1.00 | 0.99 | 1.00 | 1.00 | 1.00 | 0.99 | 1.00 | 1.01 |
| | 1.05 | 1.05 | 1.04 | 1.05 | 1.05 | 1.05 | 1.04 | 1.05 | 1.06 |
| | 1.10 | 1.10 | 1.09 | 1.10 | 1.10 | 1.10 | 1.09 | 1.10 | 1.11 |
| | 1.15 | 1.15 | 1.14 | 1.15 | 1.15 | 1.15 | 1.14 | 1.15 | 1.16 |
| | 1.20 | 1.20 | 1.19 | 1.20 | 1.20 | 1.20 | 1.19 | 1.20 | 1.21 |
| | 1.25 | 1.25 | 1.24 | 1.25 | 1.25 | 1.25 | 1.24 | 1.25 | 1.26 |
| | 1.30 | 1.30 | 1.29 | 1.30 | 1.30 | 1.30 | 1.29 | 1.30 | 1.31 |
| | 1.35 | 1.35 | 1.34 | 1.35 | 1.35 | 1.35 | 1.34 | 1.35 | 1.36 |
| | 1.40 | 1.40 | 1.39 | 1.40 | 1.40 | 1.40 | 1.39 | 1.40 | 1.41 |
| | 1.45 | 1.45 | 1.44 | 1.45 | 1.45 | 1.45 | 1.44 | 1.45 | 1.46 |
| | 1.50 | 1.50 | 1.49 | 1.50 | 1.50 | 1.50 | 1.49 | 1.50 | 1.51 |

FIG. 25

| β | -1 | -1 | -1 | 0 | 0 | 0 | 1 | 1 | 1 |
|---|---|---|---|---|---|---|---|---|---|
| α | -2 | 0 | 2 | -2 | 0 | 2 | -2 | 0 | 2 |
| β1 | -1.00 | -1.00 | -1.00 | 0.00 | 0.00 | 0.00 | 1.00 | 1.00 | 1.00 |
| α1 | -2.00 | 0.00 | 2.00 | -2.00 | 0.00 | 2.00 | -2.00 | 0.00 | 2.00 |

DETECTION AMOUNT τ1 FOR SKEW AMOUNT τ

| τ | | | | | | | | | |
|---|---|---|---|---|---|---|---|---|---|
| 0.05 | 0.07 | 0.00 | 2.50 | -2.38 | 0.00 | 2.50 | -2.38 | 0.00 | 0.05 |
| 0.10 | 0.06 | 0.00 | 1.28 | -1.16 | 0.00 | 1.28 | -1.16 | 0.00 | 0.06 |
| 0.15 | 0.06 | 0.00 | 0.87 | -0.75 | 0.00 | 0.87 | -0.75 | 0.00 | 0.06 |
| 0.20 | 0.06 | 0.00 | 0.67 | -0.55 | 0.00 | 0.67 | -0.55 | 0.00 | 0.06 |
| 0.25 | 0.06 | 0.00 | 0.55 | -0.43 | 0.00 | 0.55 | -0.43 | 0.00 | 0.06 |
| 0.30 | 0.06 | 0.00 | 0.47 | -0.35 | 0.00 | 0.47 | -0.35 | 0.00 | 0.06 |
| 0.35 | 0.06 | 0.00 | 0.41 | -0.29 | 0.00 | 0.41 | -0.29 | 0.00 | 0.06 |
| 0.40 | 0.06 | 0.00 | 0.37 | -0.24 | 0.00 | 0.37 | -0.24 | 0.00 | 0.06 |
| 0.45 | 0.06 | 0.00 | 0.33 | -0.21 | 0.00 | 0.33 | -0.21 | 0.00 | 0.06 |
| 0.50 | 0.06 | 0.00 | 0.30 | -0.18 | 0.00 | 0.30 | -0.18 | 0.00 | 0.06 |
| 0.55 | 0.06 | 0.00 | 0.28 | -0.16 | 0.00 | 0.28 | -0.16 | 0.00 | 0.06 |
| 0.60 | 0.06 | 0.00 | 0.26 | -0.14 | 0.00 | 0.26 | -0.14 | 0.00 | 0.06 |
| 0.65 | 0.06 | 0.00 | 0.25 | -0.13 | 0.00 | 0.25 | -0.13 | 0.00 | 0.06 |
| 0.70 | 0.06 | 0.00 | 0.24 | -0.11 | 0.00 | 0.24 | -0.11 | 0.00 | 0.06 |
| 0.75 | 0.06 | 0.00 | 0.22 | -0.10 | 0.00 | 0.22 | -0.10 | 0.00 | 0.06 |
| 0.80 | 0.06 | 0.00 | 0.21 | -0.09 | 0.00 | 0.21 | -0.09 | 0.00 | 0.06 |
| 0.85 | 0.06 | 0.00 | 0.20 | -0.08 | 0.00 | 0.20 | -0.08 | 0.00 | 0.06 |
| 0.90 | 0.06 | 0.00 | 0.18 | -0.06 | 0.00 | 0.18 | -0.06 | 0.00 | 0.06 |
| 0.95 | 0.06 | 0.00 | 0.19 | -0.07 | 0.00 | 0.19 | -0.07 | 0.00 | 0.06 |
| 1.00 | 0.06 | 0.00 | 0.18 | -0.06 | 0.00 | 0.18 | -0.06 | 0.00 | 0.06 |
| 1.05 | 0.06 | 0.00 | 0.18 | -0.06 | 0.00 | 0.18 | -0.06 | 0.00 | 0.06 |
| 1.10 | 0.06 | 0.00 | 0.17 | -0.05 | 0.00 | 0.17 | -0.05 | 0.00 | 0.06 |
| 1.15 | 0.06 | 0.00 | 0.17 | -0.05 | 0.00 | 0.17 | -0.05 | 0.00 | 0.06 |
| 1.20 | 0.06 | 0.00 | 0.16 | -0.04 | 0.00 | 0.16 | -0.04 | 0.00 | 0.06 |
| 1.25 | 0.06 | 0.00 | 0.16 | -0.04 | 0.00 | 0.16 | -0.04 | 0.00 | 0.06 |
| 1.30 | 0.06 | 0.00 | 0.15 | -0.03 | 0.00 | 0.15 | -0.03 | 0.00 | 0.06 |
| 1.35 | 0.06 | 0.00 | 0.15 | -0.03 | 0.00 | 0.15 | -0.03 | 0.00 | 0.06 |
| 1.40 | 0.06 | 0.00 | 0.15 | -0.03 | 0.00 | 0.15 | -0.03 | 0.00 | 0.06 |
| 1.45 | 0.06 | 0.00 | 0.14 | -0.02 | 0.00 | 0.14 | -0.02 | 0.00 | 0.06 |
| 1.50 | 0.06 | 0.00 | 0.14 | -0.02 | 0.00 | 0.14 | -0.02 | 0.00 | 0.06 |

IMAGE FORMING APPARATUS THAT ACCURATELY DETECTS SHEET IN THE FEEDING DIRECTION, AND METHOD THEREOF

BACKGROUND OF THE INVENTION

1. Field of the Invention

The present invention relates to an image forming apparatus such as a LBP (laser beam printer) or a copying machine that uses electronic photographic technology, for example, and an image formation control method.

2. Description of the Related Art

A conventional image forming apparatus is shown in FIGS. 26 and 27. FIG. 26 is a side view showing a print position adjusting mechanism in a conventional image forming apparatus. FIG. 27 is a plan view showing a part of the print position adjusting mechanism in FIG. 26. In the figures, there are shown a photosensitive drum 31, a laser device 202 that forms latent images on the photosensitive drum 31, a resist clutch (hereinafter, also referred to as "the resist roller") 203 that determines the timing of feeding a sheet, a sheet sensor 1304 that detects a fed sheet, a deviation amount detection sensor 1305 that detects the amount of deviation of a side edge in a direction perpendicular to the direction in which a sheet is fed (hereinafter referred to as "the sheet feeding direction"), an output sheet 1401, and a sheet feeding direction 1403.

In the conventional print position adjusting mechanism having the above described configuration, a CPU, not shown, obtains the deviation amount of the side edge of the sheet detected by the deviation amount detection sensor 1305 and a sheet position in the sheet feeding direction detected by the sheet sensor 1304, and transmits such information to an image control circuit, not shown. The image control circuit adjusts the timing of transferring image data that is to be transferred to a laser control circuit, not shown, that drives the laser device 202, according to the obtained information.

After a position of starting writing an image by the laser device 202 (position of starting laser beam irradiation) is set, skew of the sheet is determined according to at least two positions of the side edge of the sheet detected by the deviation amount detection sensor 1305, and thereafter displaying an error or the like is performed (for example, Japanese Laid-Open Patent Publication No. 9-219776).

However, the above described conventional print position adjusting mechanism of the image forming apparatus has a problem given below, and an improvement has been desired. That is, when sheet feeding is carried out at a high speed in order to increase printing speed, the reading capability of the sheet sensor particularly in the sheet feeding direction is insufficient; when a cheap mechanical sensor is used as a sheet sensor, the reading error is large, resulting in a deviation of the image position which is as large as the reading error.

Further, in the case that a single transparent or reflection type of optical sensor is used as a sensor that detects the leading edge of the sheet in the sheet feeding direction, when a sheet is fed with a skew, the leading edge may not be detected accurately. Therefore, it is very difficult to accurately correct the deviation of timing of feeding a sheet by a resist roller, using a single optical sensor.

Still further, the detection of the skew of a sheet is determined, according to the position of the side edge of the sheet detected by the deviation amount detection sensor 1305 during feeding of the sheet. Accordingly, image formation has already been carried out at the time a skew is detected. As a result, there is no other way but notifying the operator of the skew as an image output error.

SUMMARY OF THE INVENTION

It is a first object of the present invention to provide an image forming apparatus and an image formation control method which are capable of accurately detecting the position of a sheet in the sheet feeding direction to thereby obtain an accurate printing position even during high speed sheet feeding without an increase in the cost.

It is a second object of the present invention to provide an image forming apparatus and an image formation control method which are capable of accurately detecting skew of a sheet before formation of an image on the sheet to thereby prevent a sheet with an image formed with a low print quality due to skew of the sheet from being output.

To attain the first object, a first aspect of the present invention provides an image forming apparatus comprising an image forming section that forms an image of an original on a sheet, a resist roller that conveys the sheet to the image forming section in predetermined timing, a sheet reading section having a plurality of read pixels for reading an image of the sheet and disposed in an area which the sheet passes, between the image forming section and the resist roller in such a fashion that the plurality of read pixels are arranged in a direction perpendicular to a direction in which the sheet is fed, a leading edge detecting section that detects a leading edge of the sheet by repeatedly reading the plurality of read pixels with a predetermined period, and a start time determining section that determines timing for starting image formation by the image forming section, based on the leading edge of the sheet detected by the leading edge detecting section.

With the arrangement according to the first aspect of the present invention, the sheet reading section having a plurality of pixels is disposed between the image forming section and the resist roller in the direction perpendicular (hereinafter referred to as "the width direction") to the sheet feeding direction to detect the leading edge of the sheet. As a result, the position of the sheet in the sheet feeding direction can be accurately detected even during feeding of the sheet at a high speed, which can achieve image formation based on an accurate print position.

To attain the first object, a second aspect of the present invention provides an image forming apparatus comprising an image forming section that forms an image of an original on a sheet, a resist roller that conveys the sheet to the image forming section in predetermined timing, a sheet reading section having a plurality of read pixels for reading the image of the sheet and disposed in an area which the sheet passes, in a such a fashion that the plurality of read pixels are arranged in a direction perpendicular to a direction in which the sheet is fed, a leading edge detecting section that detects a leading edge of the sheet by repeatedly reading the plurality of read pixels with a predetermined period, a start time determining section that is responsive to the leading edge of the sheet being detected by the leading edge detecting section, for determining timing for starting image formation in the direction in which the sheet is fed by the image forming section, a side edge detecting section that detects a side edge of the sheet by repeatedly reading the plurality of read pixels read by the leading edge detecting section, and a writing start position adjusting section that adjusts a writing start position in which the image of the original is written by the image forming section in the direction perpendicular to the direction in which the sheet is fed, based on the side edge of the sheet detected by the side edge detecting section.

With the arrangement according to the second aspect of the present invention, since the leading edge and side edge of the sheet are detected by the sheet reading section having a plurality of pixels arranged in the width direction, the sheet positions in the sheet feeding direction and the width direction can be accurately detected, to thereby enable realizing image formation based on accurate print positions. Further, no special leading edge detection sensor is required, which makes it possible to decrease the number of components and hence make an image forming apparatus more compact in size.

Preferably, the leading edge detecting section repeatedly reads a part of the plurality of read pixels.

Since the leading edge detecting section thus uses a part of the plurality of pixels of the sheet reading section, the reading period is shorter and hence the pixel data density in the sheet feeding direction is higher, compared with the case of reading all of the plurality of pixels with a single read clock, resulting in improved detection accuracy.

Preferably, the side edge detecting section repeatedly reads the plurality of read pixel with a period longer than the predetermined period.

Since the side edge detecting section thus repeatedly reads pixels with a longer period than the above predetermined period, side edge detection and leading edge detection can be each carried out with the optimum detection period, thus enabling each detection to be completed in the minimum time. If the detection time becomes shorter, the distance between the resist roller and the image forming section can be shortened so that the apparatus can be made more compact in size.

Preferably, the detection of the side edge of the sheet by the side edge detecting section is carried out after the detection of the leading edge of the sheet by the leading edge detecting section.

By thus carrying out the detection of the side edge after detections of the leading edge and skew, it is possible to employ different methods for the respective detections and thus employ detection methods suitable for the respective detections to thereby increase the detection accuracy.

Preferably, the sheet reading section has a read width not less than ½ of the difference between the maximum sheet width that can be used with said image forming section and the maximum sheet width that can be used with said image forming section.

The sheet reading section has a reading width equal to or greater than ½ of the difference between the maximum sheet width that can be used with said image forming section and the maximum sheet width, the maximum and minimum sheet widths being detectable by the leading edge detecting section and the side edge detecting section, and thus the sheet positions in the sheet feeding direction and the width direction can be accurately detected for any size of sheet used in the image forming apparatus.

To attain the second object, the image forming apparatus further comprises a leading edge skew amount detecting section that detects an amount of skew of the leading edge of the sheet, based on data representative of the leading edge of the sheet detected by the leading edge detecting section.

Since the amount of skew of the sheet is thus detected based on the data that represents the leading edge of the sheet read by the plurality of read pixels by the leading edge detecting section, the calculation of the amount of the skew of the sheet and the detection of the leading edge position of the sheet can be carried out at the same time, reducing the processing time. Two separate sensors are not required for the leading edge detection and the skew detection, and thus the number of components can be decreased, thereby making the image forming apparatus still more compact in size. Skew can be accurately detected before an image is formed on the sheet, which prevents output of a sheet on which an image of a low quality is printed due to skew.

Preferably, the image forming apparatus further comprises a side edge skew amount detecting section that detects an amount of skew of the side edge of the sheet, based on the side edge of the sheet at at least two positions thereof detected by the side edge detecting section, and a leading edge skew amount correcting section that corrects the amount of skew of the leading edge detected by the leading edge skew amount detecting section, based on the detected amount of skew of the side edge detected by the side edge skew amount detecting section.

Since the amount of leading edge skew detected by the leading edge skew amount detecting section is thus corrected based on at least two side edge positions of the sheet detected by the side edge detecting section and the detected amount of side edge skew of the sheet, the detection accuracy of the amount of skew can be further improved.

Preferably, in the second aspect of the present invention, the image forming section comprises an original reading section that reads the image of the original, a laser device that irradiates a laser beam, an image carrier that has formed thereon a latent image of the image of the original read by the original reading section by the laser beam irradiated by the laser device, and a developing section that developes the latent image formed on the image carrier and transfers the developed latent image onto the sheet, and wherein the start timing determining section determines timing for starting irradiation by the laser beam onto the image carrier in the direction in which the sheet is fed.

More preferably, the distance between the sheet reading section and a transfer position in which the latent image is transferred onto the sheet by the developing section is at least equal to the sum of a distance around a periphery of the image carrier between a position of the image carrier in which the laser beam is irradiated by the laser device and the transfer position and a distance corresponding to a period of time from start of reading the sheet by the sheet reading section to determination of the timing for starting irradiation by the start timing determining section.

Preferably, the sheet reading section is disposed between the image forming section and the resist roller.

Preferably, the image forming section comprises an original reading section that reads the image of the original, a laser device that irradiates a laser beam, an image carrier that has formed thereon a latent image of the image of the original read by the original reading section by the laser beam irradiated by the laser device, and a developing section that developes the latent image formed on the image carrier and transfers the developed latent image onto the sheet, wherein the start timing determining section determines timing for starting irradiation by the laser beam onto the image carrier in the direction in which the sheet is fed, and wherein the writing start position adjusting section sets as the writing start position a position of the image carrier in which the laser beam starts to be irradiated by the laser device in the direction perpendicular to the direction in which the sheet is fed.

In this case, preferably, the distance between the sheet reading section and a transfer position in which the latent image is transferred onto the sheet by the developing section is at least equal to the sum of a distance around a periphery of the image carrier between a position of the image carrier in which the laser beam is irradiated by the laser device and the transfer position and a distance corresponding to a period of time from start of reading the sheet by the sheet reading section to determination of the timing for starting irradiation by the start timing determining section and setting of the writing start position by the writing start position adjusting section.

Further, to attain the first object, a third aspect of the present invention provides an image formation control method for an image forming apparatus comprising an image forming section that forms an image of an original on a sheet, a resist roller that conveys the sheet to the image forming section in predetermined timing, a sheet reading section having a plurality of read pixels for reading an image of the sheet, the method comprising the steps of disposing the sheet reading section in an area which the sheet passes, between the image forming section and the resist roller in such a fashion that the plurality of read pixels are arranged in a direction perpendicular to a direction in which the sheet is fed, detecting a leading edge of the sheet by repeatedly reading the plurality of read pixels with a predetermined period, and determining timing for starting image formation by the image forming section, based on the leading edge of the sheet detected in the leading edge detecting step.

To attain the first object, a fourth aspect of the present invention provides an image formation control method for an image forming apparatus comprising an image forming section that forms an image of an original on a sheet, a resist roller that conveys the sheet to the image forming section in predetermined timing, a sheet reading section having a plurality of read pixels for reading an image of the sheet, the method comprising the steps of disposing the sheet reading section in an area which the sheet passes, between the image forming section and the resist roller in such a fashion that the plurality of read pixels are arranged in a direction perpendicular to a direction in which the sheet is fed, detecting a leading edge of the sheet by repeatedly reading the plurality of read pixels with a predetermined period, determining timing for starting image formation by the image forming section, based on the leading edge of the sheet detected in the leading edge detecting step, detecting a side edge of the sheet by repeatedly reading the plurality of the read pixels read in the leading edge detecting step, and adjusting a start position of writing the image of the original in the direction perpendicular to the direction in which the sheet is fed, based on the detected side edge of the sheet.

Although the sheet reading section, the leading edge detecting section, and the side edge detecting section employ a CIS in an embodiment described later, this is not limitative, but any other configuration that can implement these functions is applicable.

Further, the writing start position adjusting section, the side edge skew amount detecting section, the leading edge skew amount correcting section, and the start time determining section, which will be described in the embodiment described later, are not limitative, but any other configuration that can implement these functions is applicable.

The above and other objects, features, and advantages of the invention will become more apparent from the following detailed description taken in conjunction with the accompanying drawings.

BRIEF DESCRIPTION OF THE DRAWINGS

FIG. 18 is a view showing a table of values of $\beta 1$ obtained by Expression (1) with variables $\alpha$ and $\beta$;

FIG. 19 is a view showing a table of errors in the value $\beta 1$ obtained by the ratio of the value $\beta 1$ to the actual value $\beta$, the errors being shown in percentage;

FIG. 21 is a view showing a table of values of an amount of skew $\beta 2$ obtained by the detection of the leading edge obtained by an expression (2) with variables $\alpha$ and $\beta$;

FIG. 22 is a view showing a table of values of a1 obtained by Expression (4) with variables $\alpha$ and $\beta$;

FIG. 23 is a view showing a table of errors in the value $\alpha 1$ obtained by the ratio of the value $\alpha 1$ to the actual value $\alpha$, the errors being shown in percentage;

FIG. 24 is a view showing a table of amounts of skew obtained by the detection of the leading edge relative to the amount of skew $\beta$ of the sheet in an adjustment mode and the sensor mounting angle of $\alpha$;

FIG. 25 is a view showing a table of errors from the theoretical values in FIG. 24, the errors being shown in percentage;

DETAILED DESCRIPTION OF THE PREFERRED EMBODIMENTS

Figure 1:
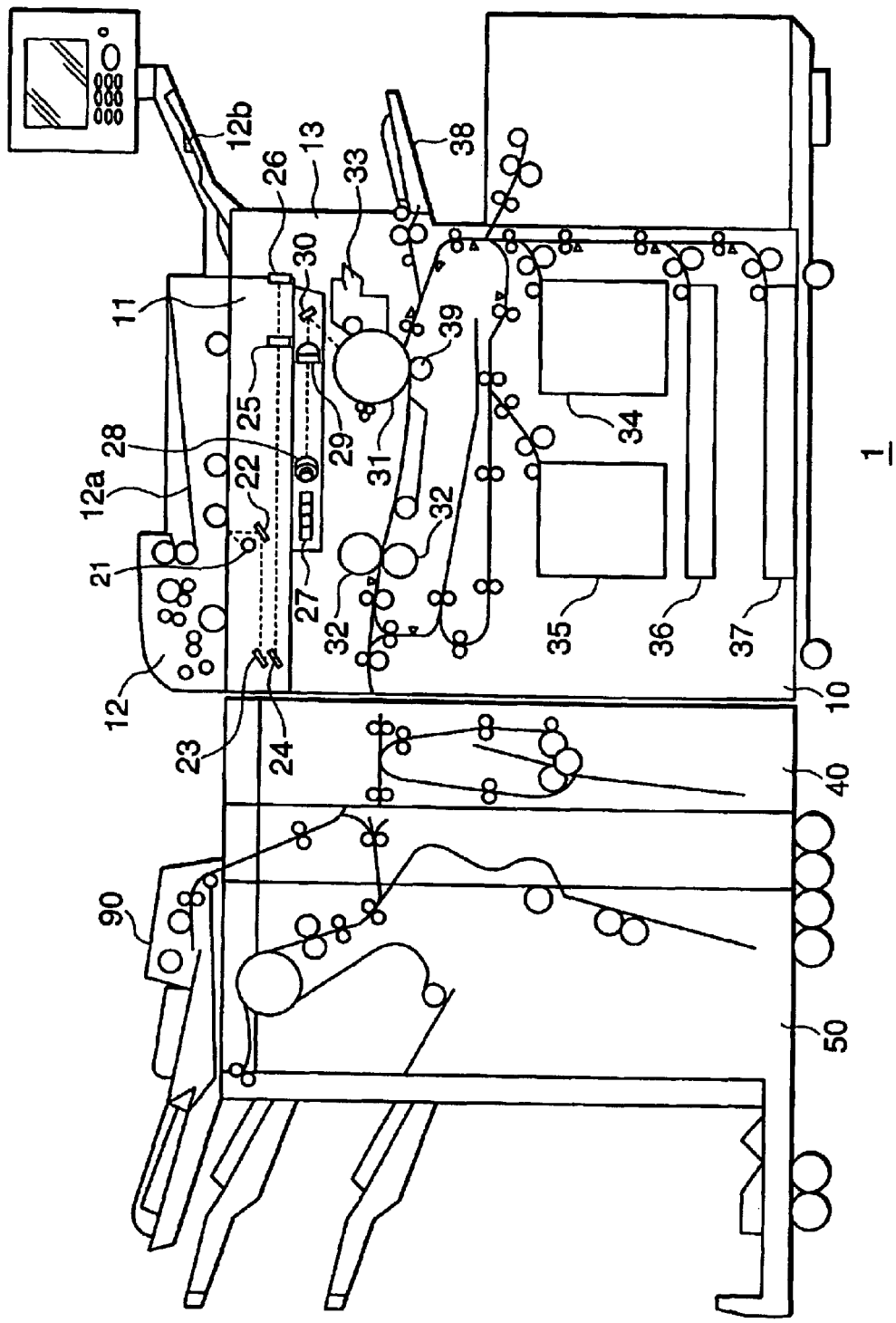
FIG. 1 is a diagram showing the configuration of an image forming apparatus according to an embodiment of the present invention.

The present invention will now be described in detail below with reference to the accompanying drawings showing a preferred embodiment thereof. In the drawings, elements and parts which are identical throughout the views are designated by identical reference numeral, and duplicate description thereof is omitted.

Entire Configuration

FIG. 1 is a diagram showing the configuration of an image forming apparatus 1 according to an embodiment of the present invention. The image forming apparatus 1 is comprised of an image forming apparatus main body 10, a bending unit 40, and a finisher 50. The image forming apparatus main body 10 is comprised of an image reader 11 for reading images of originals, and a printer 13.

In the image reader 11, an original feeder 12 is mounted. The original feeder 12 feeds originals, which are set face up on an original tray 12a, one by one in turn from the top page to the leftward direction in the figure, conveys each original onto a platen glass through a curved path, and stops the original at a predetermined location, and then, by causing a scanner unit 21 to scan the original from the left to the right in this state, the original is read. Then, the original is discharged toward an external discharge tray 12b.

The reading face of an original is irradiated with light from a scanner unit 21, and reflecting light from the original is guided to a lens 25 through mirrors 22 to 24. The light passing through the lens 25 forms an image on the image pickup face of an image sensor 26.

The image of the original is read by the image sensor 26 in the main scanning direction line by line while the scanner unit 21 is moved in the subscanning direction, thereby reading the entire image of the original. The optically read image is converted into image data by the image sensor 26 and output therefrom. The image data output from the image sensor 26 is subjected to predetermined processing by an image signal controller (image processing circuit), not shown, and then input to an exposure controller (laser control circuit), not shown, of the printer 13 as a video signal.

The exposure controller of the printer 13 modulates a laser beam that is output by a laser device, not shown, according to the input image data, and the modulated laser beam is irradiated onto a photosensitive drum 31 through mirrors 28 to 30, while being scanned by a polygon mirror 27.

On the photosensitive drum 31, an electrostatic latent image is formed according to the scanned laser beam. This electrostatic latent image on the photosensitive drum 31 is visualized as a developed image by a developer supplied by a developing unit 33. In timing synchronous with the start of irradiation of the laser beam, a sheet is fed from a cassette 34, 35, 36, 37, a manual feeding section 38, or a both side conveying path, and conveyed to the image forming section through a resist roller.

The sheet is conveyed between the photosensitive drum 31 and a transfer roller 39, and thus the developed image formed on the photosensitive drum 31 is transferred to the sheet fed by the transfer roller 39. The sheet on which the developed image has been transferred is conveyed to a fixing section 32 that heat presses the sheet to thereby fix the developed image on the sheet. The sheet that has passed through the fixing section 32 is discharged to the outside (the bending unit 40) from the printer 13 through a flapper and a discharge roller.

To discharge a sheet with an image forming face thereof in a face-down state, the sheet, which has passed through the fixing section 32, is once guided into a reverse path by a switching operation of the flapper, and after the trailing edge of the sheet passes through the flapper, the sheet is switched back and discharged from the printer 13 by the discharge roller.

To form an image on a hard sheet such as an OHP sheet that has been fed from the manual feeding section 38, the sheet is discharged by the discharge roller with an image forming face thereof in a face-up state without being guided to the reverse path.

Further, in the case that a double-sided recording mode in which images are formed on both faces of a sheet, is set, the sheet is being guided to the reverse path by a switching operation of the flapper, conveyed to the both side conveying path, and then fed again between the photosensitive drum 31 and the transfer section in the timing mentioned above.

A sheet discharged from the printer 13 is conveyed to the bending unit 40. The bending unit 40 bends the sheet into a Z-shape. For example, in the case that the sheet is in the A3 or B4 size and bending processing is designated, the bending unit 40 carries out the sheet bending operation, while in other cases, the sheet discharged from the printer 13 is caused to pass through the bending unit 40 to be conveyed to a finisher 50. The finisher 50 is provided with an inserter 90 for feeding special sheets such as cover sheets and interleaved sheets to be inserted between sheets having images formed thereon. The finisher 50 carries out various processes such as bookbinding, binding, and punching.

In the present embodiment a photosensitive drum is used as the image carrier of the image forming apparatus, however, a photosensitive belt may be used.

Sheet Feeding Timing and Image Writing Timing

Figure 2:
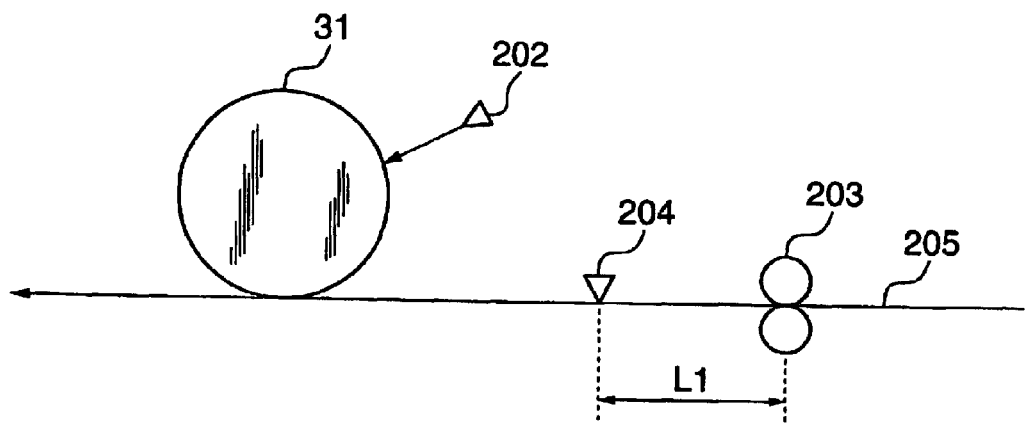
FIG. 2 is a diagram showing a print position adjusting mechanism disposed on a sheet conveying path leading to a photosensitive drum.

FIG. 2 is a diagram showing a print position adjusting mechanism disposed on a sheet conveying path leading to the photosensitive drum. In the figure, there are shown the sheet conveying path 205, the photosensitive drum 31 described above, and the laser device 202 that forms latent images on the photosensitive drum 31. The position of the laser device 202 is schematically illustrated as being positioned at an imaginary location for the sake of explanation, but not at the actual location. The sheet conveying roller (resist roller) 203 is configured such that a sheet being conveyed along the sheet conveying path 205 strikes against the resist roller 203 to temporarily stay there, and thereafter starts to be conveyed out to the photosensitive drum 31 in predetermined sheet feeding timing. An image reading sensor (image sensor) 204, which is composed of a photoelectric conversion device array such as a CCD or a CIS, reads the image to detect the position of the sheet. In the present embodiment, as the image reading sensor 204, a CIS (contact image sensor) is employed. The CIS 204 is arranged at a distance L1 (see FIG. 3) from the resist roller 203 on the photosensitive drum 31 side.

Figure 3:
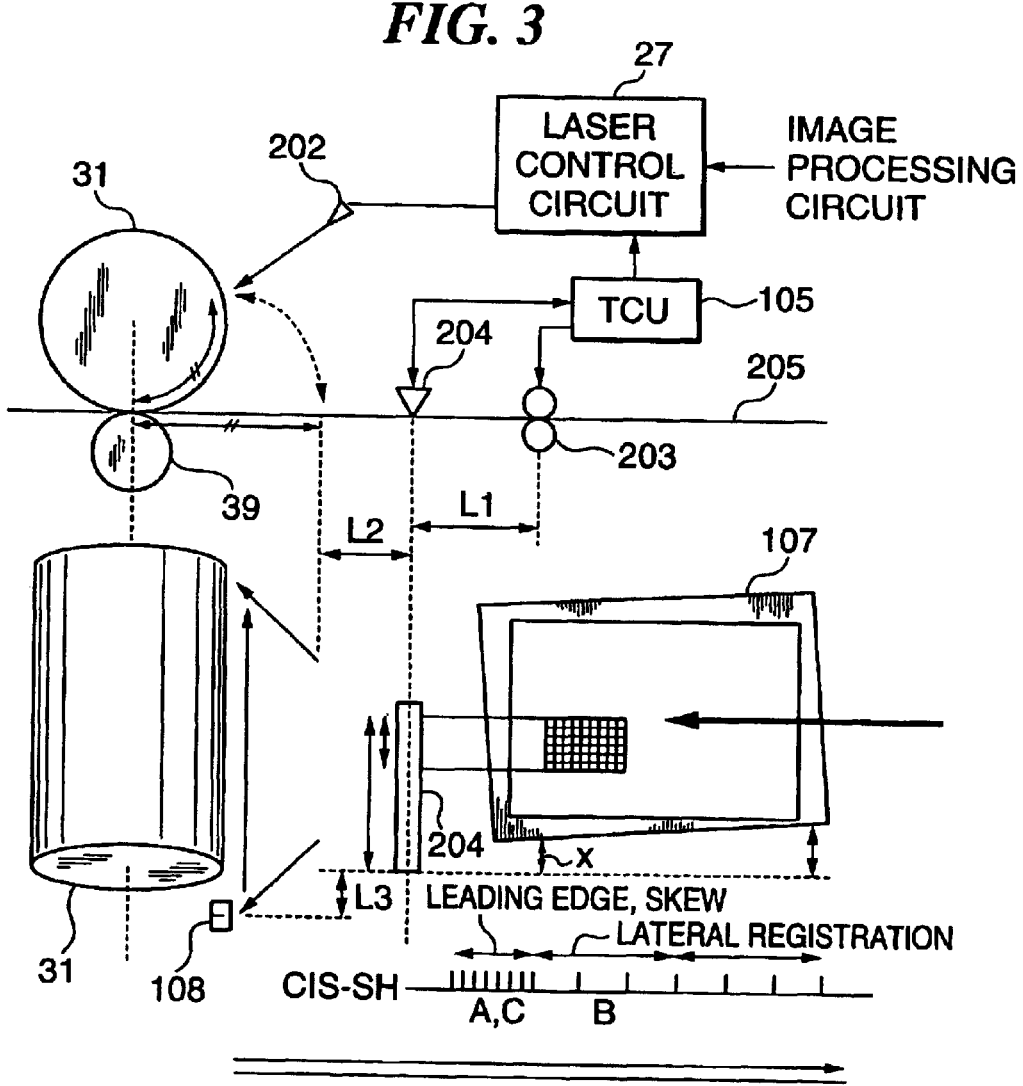
FIG. 3 is a diagram showing the relationship between sheet feeding timing and image forming timing.

FIG. 3 shows the relationship between the sheet feeding timing and the image forming timing. When an image forming operation is performed, the sheet sent out by the resist roller 203 is conveyed along the sheet conveying path 205 toward the photosensitive drum 31, as described above. On this occasion, control is provided such that a laser beam is irradiated on the photosensitive drum 31 when the sheet, which was sent out from the resist roller 203, has advanced a distance L1+L2. For example, when a timer counts up a period of time required to elapse from the time the resist roller 203 is turned on to the time the sheet advances the distance L1+L2, the photosensitive drum 31 is irradiated with the laser beam.

Further, to accurately adjust the writing start position (laser beam irradiation start position), it is required to detect writing start timing in the sheet feeding direction (for convenience sake, referred to as "the subscanning direction") and writing start timing in a perpendicular direction (for convenience sake referred to as "the main scanning direction") to the direction of feeding the sheet so that the writing by a laser beam is controlled.

Specifically, the leading edge position of the sheet is detected by the CIS 204, and then the start time of image forming is decided, and when the sheet has moved the distance L2, the writing by the laser beam is started, thereby adjusting the writing start position of the image in the subscanning direction. That is, the distance L2 needs to be set to a distance that corresponds to a period of time from the time the CIS 204 detects the leading edge of the sheet to the time the deviation of the sheet in the sheet feeding direction and the deviation in the perpendicular direction to the sheet feeding direction is detected to thereby set the writing start timing by the laser beam for each of the directions.

The sheet conveying speed and the peripheral speed of the photosensitive drum 31 are set to be equal in a typical image forming apparatus. Therefore, the distance between the position to which the sheet has moved for the distance L2 from the CIS 204 and the position in which the image is transferred onto the sheet, which is the nip position of the transfer roller 39 and the photosensitive drum 31, and the peripheral distance along the photosensitive drum 31 between the writing start position by the laser beam and the position in which the image is transferred onto the sheet, are equal to each other.

When the side edge (lateral registration) of the sheet is detected by the CIS 204, a distance L3 between a beam detector (BD) 108 and the lower end of the CIS 204 is added to a distance x between the lower end of the CIS 204 and the side edge of the sheet to calculate the total distance (L3+x). When the laser beam is detected by the beam detector 108, the laser beam is moved in the main scanning direction over the calculated distance, and then the writing by the laser beam is started. Thus, the writing start position of the image in the main scanning direction is adjusted.

Such adjustment of the writing start position of the image by the laser beam in the subscanning and main scanning directions is carried out by a timing control unit (TCU) 105, described later. Specifically, the TCU 105 turns on the resist roller 203 to start conveying the sheet and then outputs a writing start timing signal to a laser control circuit 127 according to a detection signal from the CIS 204. The laser control circuit 127 drives the laser device 202 according to an image signal sent from an image processing circuit, not shown, in synchronism with the writing start timing signal output from the TCU105.

Configuration of CIS

Figure 4:
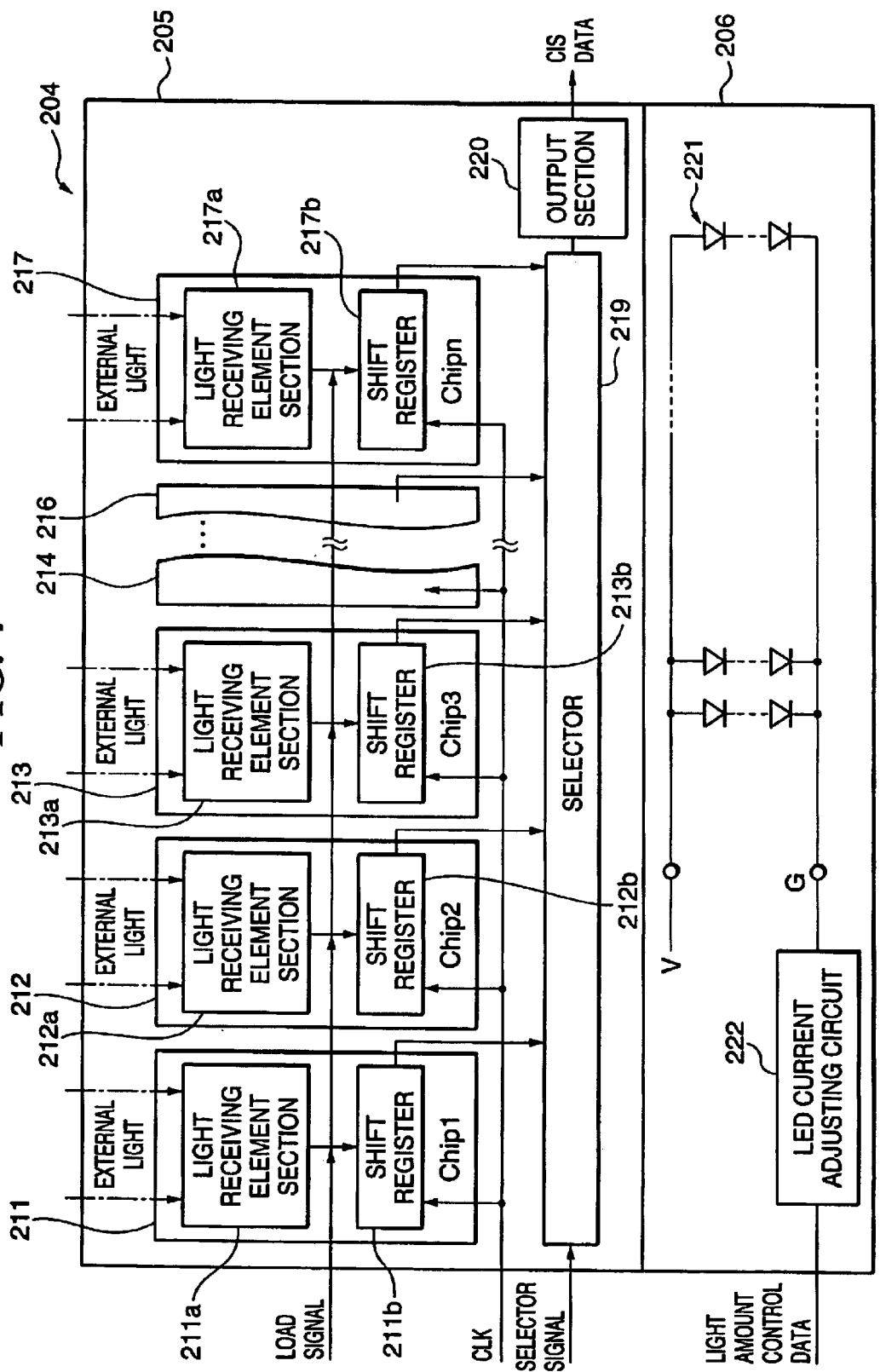
FIG. 4 is a diagram showing the configuration of a CIS 204.

FIG. 4 is a diagram showing the configuration of the CIS 204. This CIS 204 is comprised of an image reading section 207, and an LED light source section 206. The image reading section 207 is comprised of a plurality of chips (1 to n) 211 to 217, each chip having a light receiving element section and a shift register therein, a selector 219, and an output section 220. In the present embodiment, seven chips are used (n=7). The light receiving element section in each chip is provided with 1000 read pixels.

Out of the total number, 7000, of effective read pixels in the entire CIS, 1000 read pixels in the chip (1) 211 disposed at the head are used for reading in the subscanning direction (detection of the leading edge and detection of the skew, described later). On the other hand, 6000 read pixels in the remaining six chips (2 to 7) 212 to 217 are used for reading in the main scanning direction (detection of the side edge, described later). The number of effective pixels, that is, the sum of the pixels in the plurality of chips described above is an example, which is not limited to a certain number and may be an arbitrary number. Division of chips is not limited to 1: (n−1) as in the present embodiment, but may be in an arbitrary division number.

In the image reading section 207, when the selector 219 selects a certain chip, for example, only the chip 211 used for detections of the leading edge and the skew to render it effective, according to a selector signal from the TCU 105, an image signal detected by a light receiving element section 211a is once read out to a shift register 211b in response to a load signal (CIS-SH) from the TCU 105, and then sequentially transferred from the shift register 211b to the output section 220 through the selector 219 according to a clock (CLK) from the TCU 105. The output section 220 converts the transferred serial image signal into parallel data and outputs the parallel data as CIS data.

When the selector 219 selects the chips 212 to 217 used for detection of the side edge to render them effective, according to a selector signal from the TCU 105, an image signal detected by each light receiving element 212a to 217a is once read out to a corresponding shift register 212b to 217b in response to a load signal from the TCU 105, and then sequentially transferred from the shift registers 212b to 217b, to the output section 220 through the selector 219 according to a clock (CLK) from the TCU 105. The output section 220 converts the transferred serial image signal into parallel data to output it as CIS data.

On the other hand, the LED light source section 206 is comprised of an LED section 221 configured by connecting LED groups in parallel, each LED group consisting of serially connected LEDs, and an LED current adjusting circuit 222, which is connected to the cathode of each LED group and adjusts current flowing into each LED group. The LED current adjusting circuit 222 adjusts the light emission amount of the entire LED section 221 according to light amount control data from the TCU 105.

Figure 5:
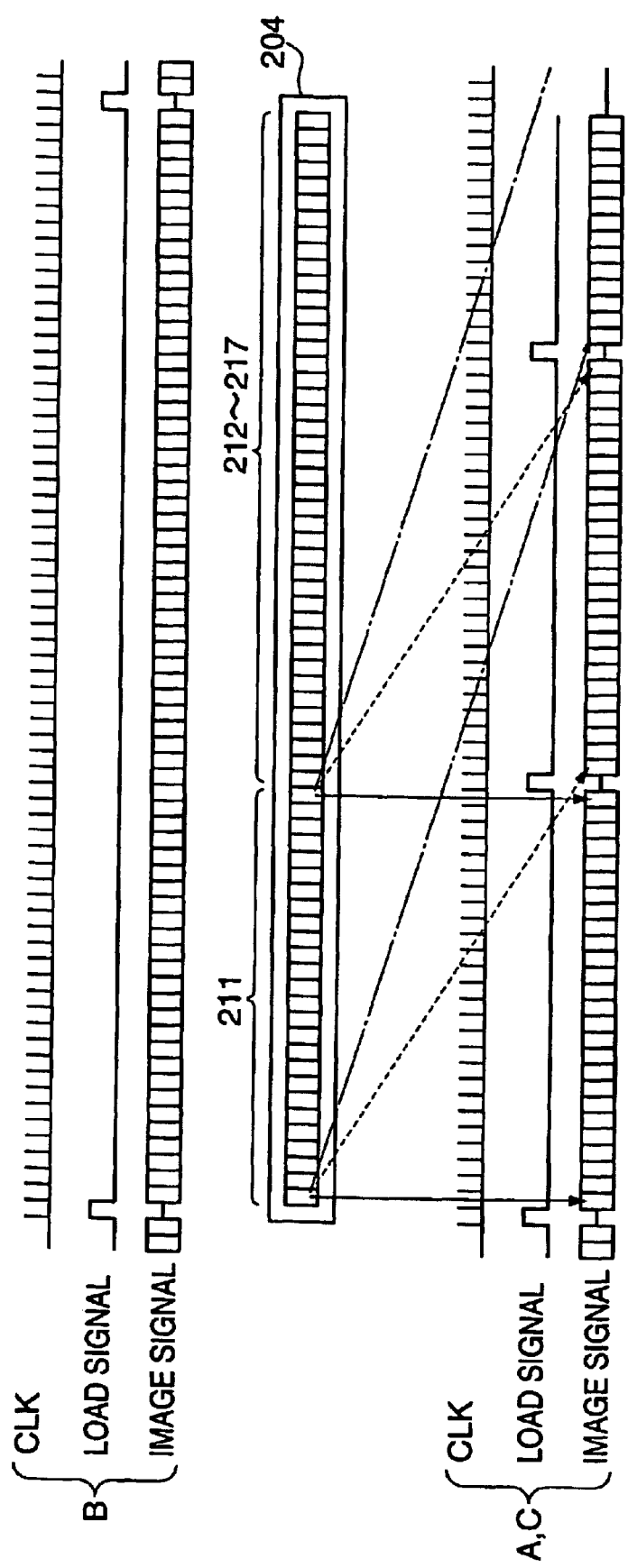
FIG. 5 is a timing chart showing changes in a clock (CLK), a load signal (CIS-SH), and an image signal of the CIS 204 for use in carrying out detections of a leading edge, skew, and a side edge.

FIG. 5 is a timing chart showing changes in the clock (CLK), the load signal (CIS-SH), and the image signal of the CIS 204 when carrying out the detections of the leading edge, the skew, and the side edge. In the case of the detections of the leading edge and the skew (A and C in the figure), the light receiving element 211a to be used is for one chip, and thus the charge accumulating time period determined by the image signal being repeatedly read out according to the load signal is shorter. In this case, using the light amount control data from the TCU 105, the LED current value by the LED current adjusting circuit 222 is set high to increase the LED light emission amount, whereby the S/N ratio of the read image is kept from dropping. On the other hand, in the case of the detection of the side edge (B in the figure), 6 light receiving element sections, 212a to 217a, are used, which makes the charge accumulating time period determined by the image signal being repeatedly read out according to the load signal is longer.

In this case, using the light amount control data from the TCU 105, the LED current value by the LED current adjusting circuit 222 is set low to decrease the LED light emission amount, though the required S/N ratio of the read image is maintained.

Figure 6:
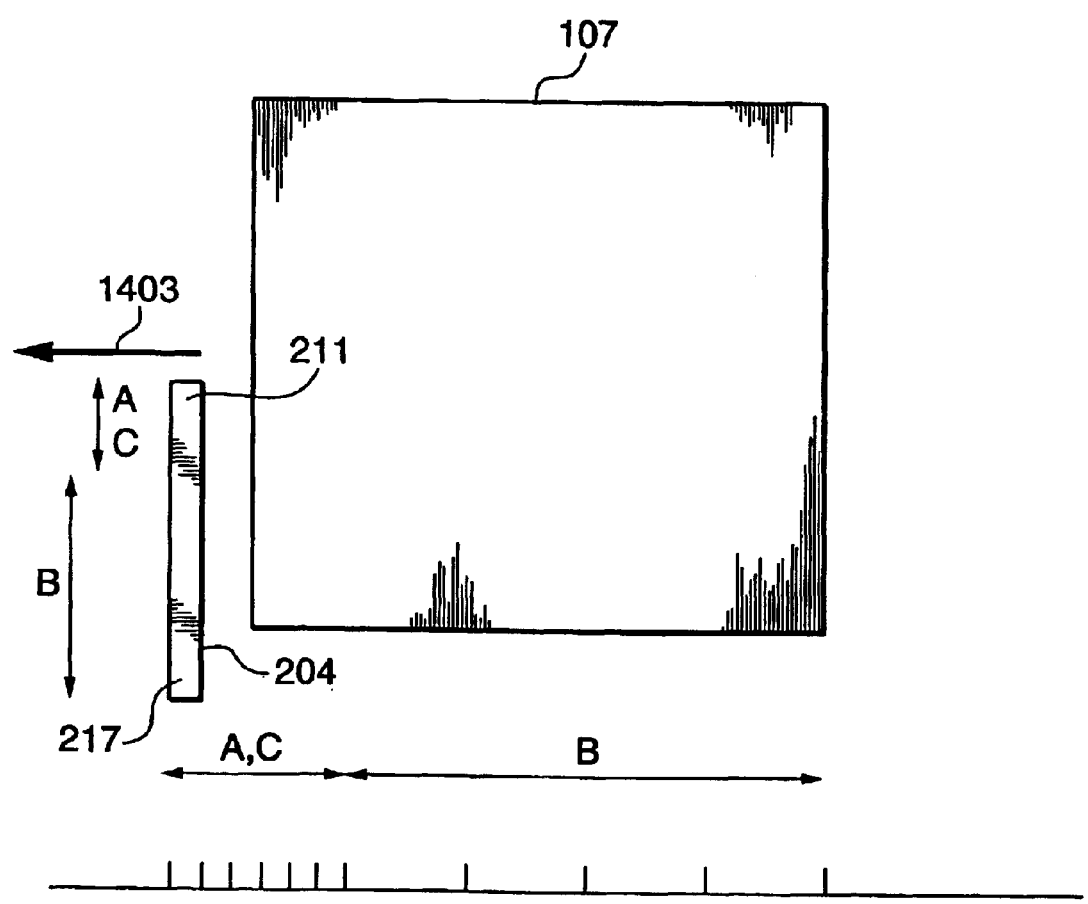
FIG. 6 is a diagram showing the disposition of the CIS 204 in a sheet passing area.

FIG. 6 is a diagram showing the disposition of the CIS 204 in the sheet passing area. The CIS 204 is disposed in such a fashion that the read pixels are arranged in the perpendicular direction to the conveying direction of a sheet 107 (hereinafter referred to as "the width direction"). Further, the CIS 204 is disposed such that one end of the CIS 204 is positioned almost at the center of the passing sheet 107, and the other end is located outside the side edge of the passing sheet 107. In the CIS 204, the chip (1) 211 is positioned almost at the center of the sheet 107, and the chip (7) 217 is positioned outside the side edge of the sheet 107.

Figure 7:
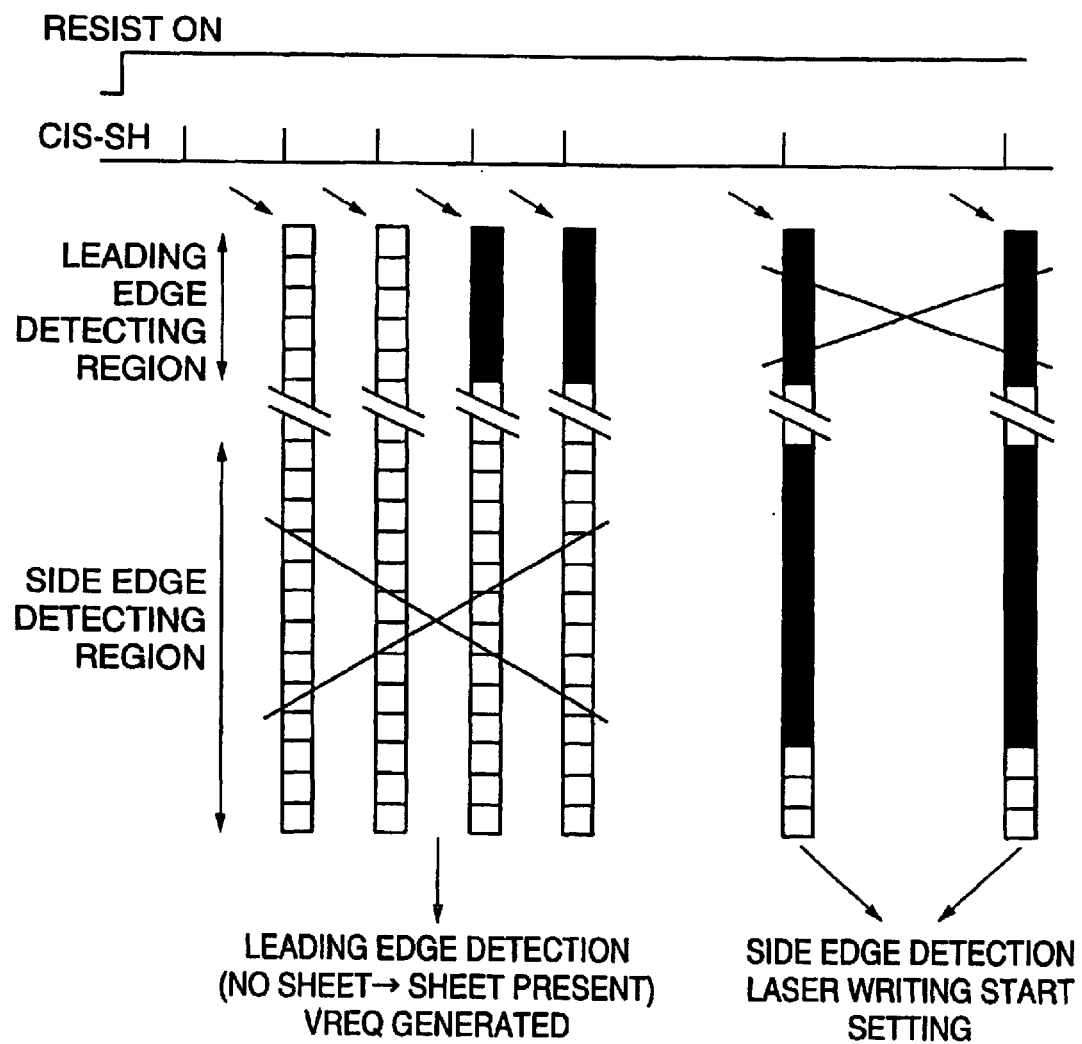
FIG. 7 is a diagram showing a leading edge detecting region and a side edge detecting region of the CIS 204.

FIG. 7 is a diagram showing a leading edge detecting region and a side edge detecting region of the CIS 204. As described above, the leading edge (skew) detection region corresponds to the 1000 pixels included in the light receiving element section 211a in the CIS 204 positioned almost at the center of the sheet 107. During the detection of the leading edge (skew), the remaining read pixels in the CIS are not used (shown by x in the left half of the figure). On the other hand, the side edge detecting region corresponds to the 6000 pixels included in the remaining light receiving element sections 212a to 217a in the CIS 204. During the detection of the side edge, the 1000 pixels in the light receiving element section 211a for detection of the leading edge are not used (shown by x in the right half of the figure).

In the above described way, detection of the leading edge and detection of the side edge are performed by taking only the necessary pixel data, suitable for respective detections, of the read pixels in the CIS 204, so that data unnecessary for respective detection are avoided from being used.

Figure 8:
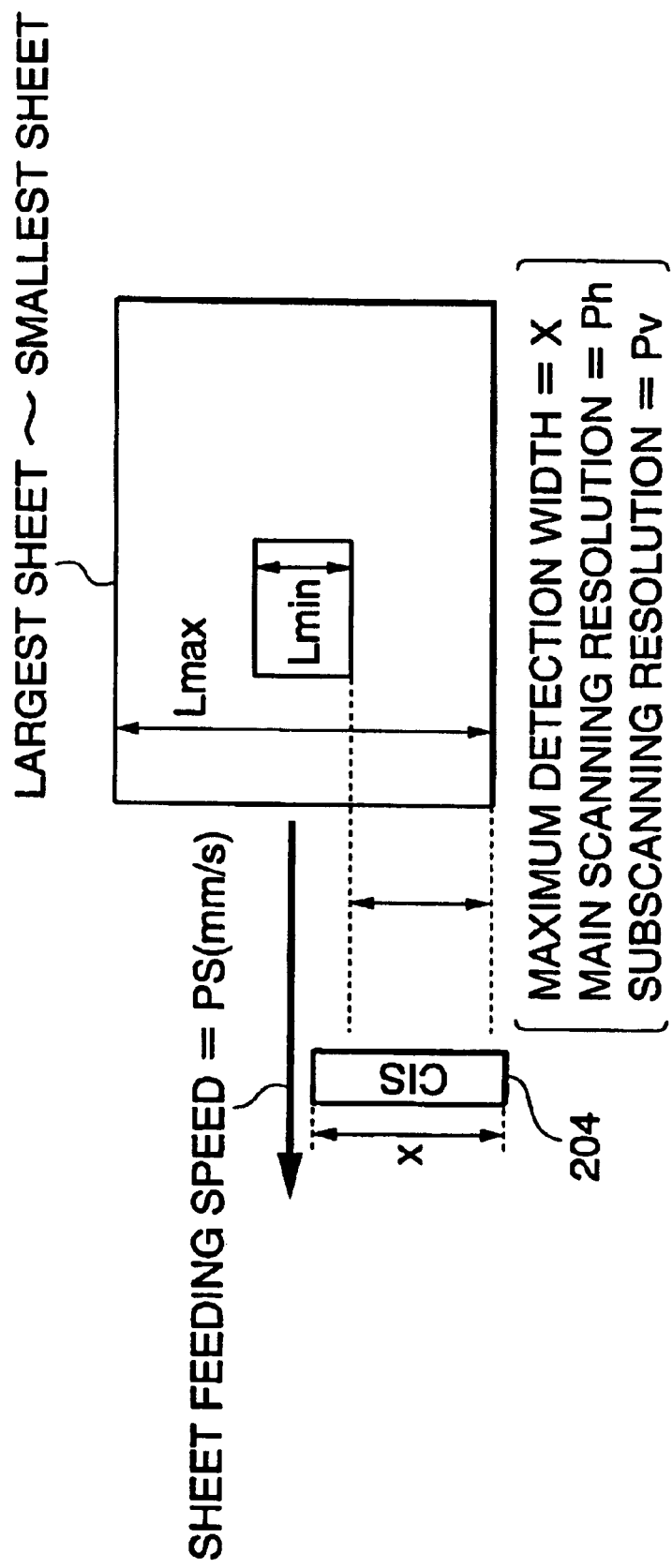
FIG. 8 is a diagram showing the maximum detection width of the CIS 204.

FIG. 8 is a diagram showing the maximum detection width of the CIS 204. Assuming that the maximum sheet width that can be used with the image forming apparatus is designated by Lmax and the minimum sheet width by Lmin, the maximum detection width of the CIS 204 is approximately ½ (Lmax-Lmin), and thus it is understood that a CIS 204 having a detection width equal to or greater than such a maximum detection width x should be used.

Now, the advantage of using a CIS for detection of the leading edge (skew) will be described. For example, assuming that the sheet feeding speed (PS) is 800 mm/s, the maximum detection width (x) is 100 mm, the main scanning resolution Ph is 0.05 mm, and the subscanning resolution Pv is 0.05 mm, then the sensor 1 line reading frequency=PS/Pv=16 kHz and the sensor pixel number=X/Ph=2000 dots hold, and accordingly VCLK=16 KHz*2000 dot=32 MHz holds according to a typical method of using the sensor. That is, a sensor that can operate at 32 MHz is required.

However, according to the system employed in the present embodiment, if the number of pixels used for reading in the subscanning direction is set, for example, at 200 dots, that is, 1/10 the number of pixel in the above assumption, then VCLK=16 KHz*200 dot=3.2 MHz holds. Therefore, a sensor that can operate at 3.2 MHz can be used, which makes it possible to employ an inexpensive CIS. Further, in reading in the main scanning direction, because the clock VCLK is set at 3.2 MHz as above, detection is possible to carry out only once for the moving distance of 10 lines. However, such a low rate detection is allowed for detection of the side edge.

Further, a plurality of pixels in the main scanning direction are used as pixel data to be used for detections of the leading edge and skew, and therefore a sensor for detection of the leading edge is not required. As a result, it is possible to make the image forming apparatus smaller in size by reducing the number of components, compared to an image forming apparatus using a conventional single optical sensor or a mechanical sheet detecting sensor.

Further, since detection of the side edge is carried out after detection of the leading edge and detection of the skew, different methods can be used as their respective detection methods, and thus it is possible to improve the detection accuracy by adopting detection methods suitable for respective detections.

Particularly, in detection of the leading edge, using data of only a part of the plural pixels in the main scanning direction contributes to improvement in detection accuracy. This is because the reading period is shorter compared to the case of reading all the plurality of pixels with the same reading clock, whereby the density of pixel data in the sheet feeding direction is higher, resulting in improvement of detection accuracy.

As regards the sequence of detection, if the detection of the leading edge which is detected first, is carried out simultaneously with detection of the side edge instead of carrying out the detection of the leading edge first, all the plurality of pixels in the CIS 204 must be read for detection of the side edge, which makes the period of detection of the leading edge long, whereby the detection of the leading edge cannot be achieved with high accuracy. Therefore, to carry out detection of the leading edge (detection of the skew) first and then detection of the side edge enables detection of the leading edge to be achieved with higher accuracy.

Further, by carrying out detection of the leading edge and detection of the side edge separately, the period of execution of each detection process can be set to the optimum period in a shortest time, and thus the conveying distance that corresponds to the distance L2 between the resist roller and the image forming section, can be shortened, to enable the apparatus to be designed more compact in size.

Configuration of Control Circuit

Figure 9:
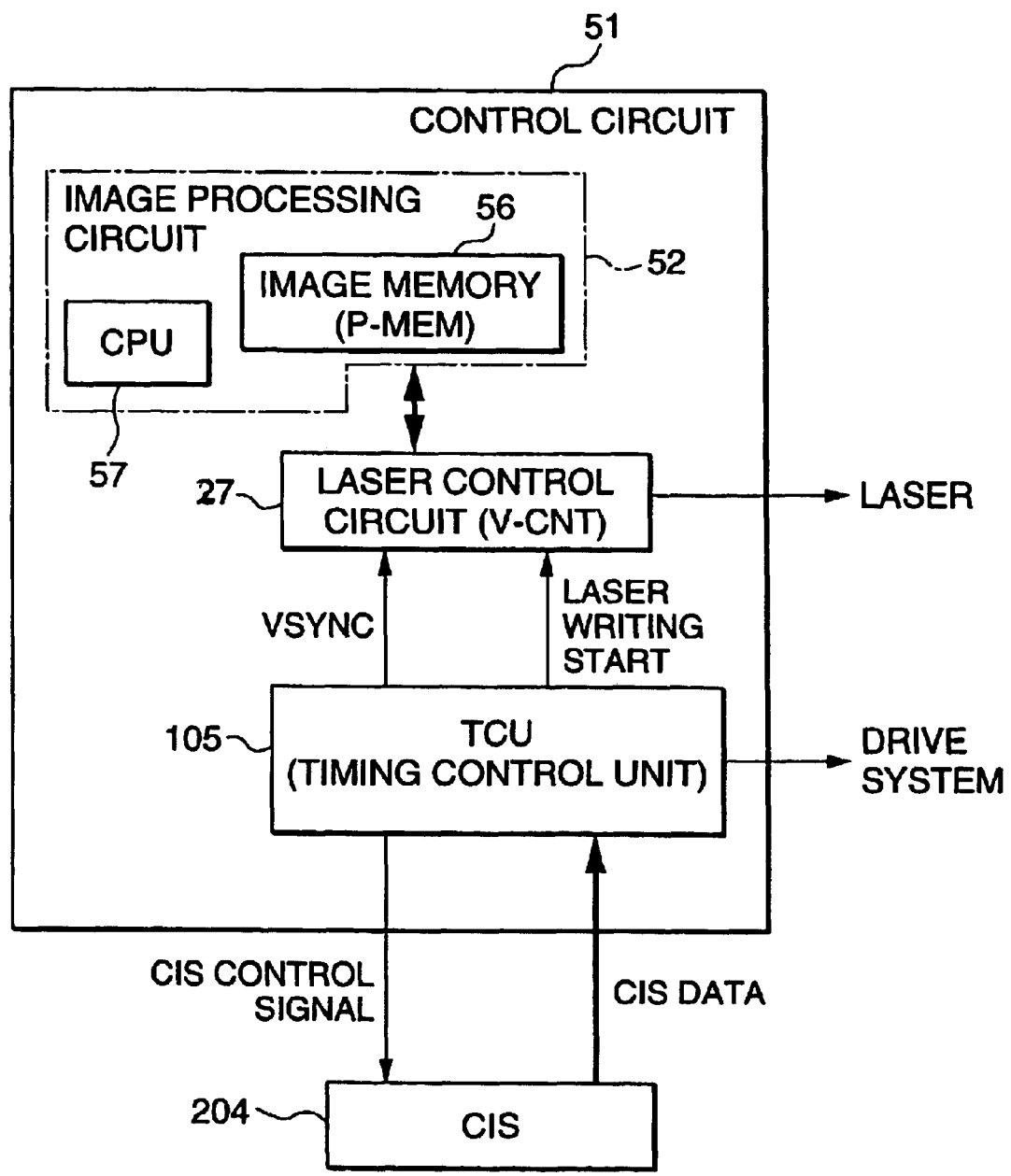
FIG. 9 is a block diagram showing the configuration of a control circuit.

FIG. 9 is a block diagram showing the configuration of a control circuit 51. The control circuit 51 includes an image processing circuit 52, the laser control circuit (V-CNT) 127, and the timing control unit (TCU) 105. The image processing circuit 52 is provided with an image memory (P-MEM) 56 in which image data read by the image sensor 26 is stored, and a CPU 57 that processes the data stored in the image memory 56.

The laser control circuit 127 outputs a drive signal to the laser device 202 in response to an output signal that is output from the image processing circuit 52 according to the image data. The outputting of the drive signal to the laser device 202 is carried out in synchronism with a timing signal from the TCU 105. The TCU 105 outputs a CIS control signal to the CIS 204, inputs CIS data read by the CIS 204, and outputs the timing signal to the laser control circuit 127, based on the CIS data. The timing signal includes a vertical synchronizing signal VSYNC, a clock VCLK, and a laser writing start signal comprised of a horizontal synchronizing signal HSYNC, as well as a signal (resist on signal) that drives the resist roller 203, and the like.

Figure 10:
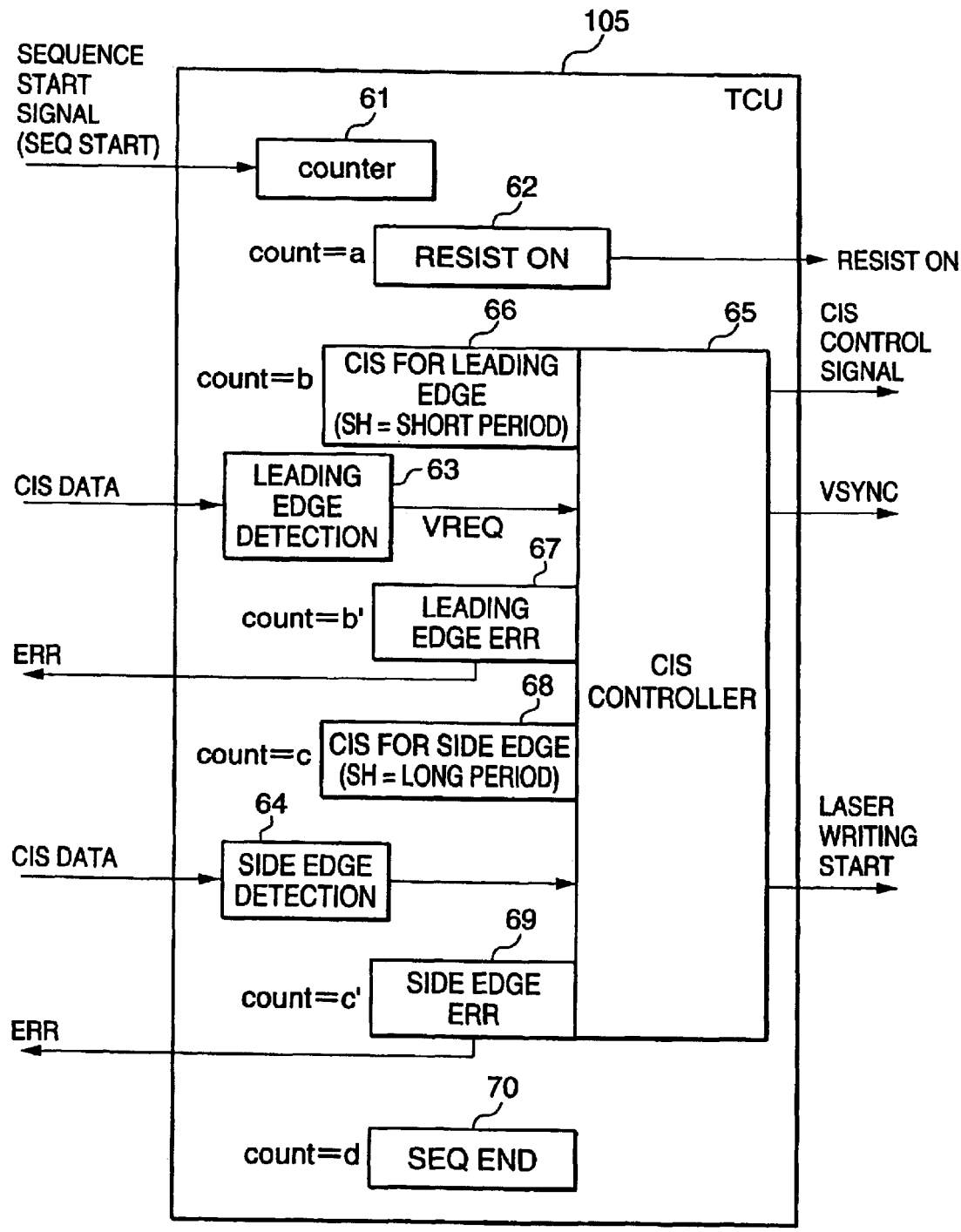
FIG. 10 is a block diagram showing the configuration of a TCU 105.

FIG. 10 is a block diagram showing the configuration of the TCU 105. The TCU 105 is comprised of a counter 61, a resist ON section 62, a leading edge detecting section 63, a side edge detecting section 64, a CIS controller 65, a short period setting section 66 for CIS leading edge detection, a leading edge error detecting section 67, a long period setting section 68 for CIS side edge detection, a side edge error detecting section 69, and a sequence termination setting section (SEQEND) 70.

The counter (counter) 61 is actuated by a sequence start signal (SEQSTART) to count a clock with a fixed period. The resist ON section 62 causes the resist roller 203 to be driven or stopped. The leading edge detecting section 63 detects the leading edge of a sheet, based on the CIS data input from the CIS 204. The side edge detecting section 64 similarly detects the side edge of the sheet, based on the CIS data input from the CIS 204.

The CIS controller 65 outputs CIS control signals such as the load signal (CIS-SH), a clock (CIS-CLK), a selector signal, light amount control data, to the CIS 204. The short period setting section 66 sets the period of the load signal (CIS-SH) to be input to the CIS 204 to a short period TS when detecting the leading edge of the sheet. On the other hand, the long period setting section 68 sets the period of the load signal (CIS-SH) to be input to the CIS 204 a long period TL when detecting the side edge of the sheet. In the present embodiment, the long period TL is six times as long as the short period TS.

The leading edge error detecting section 67 generates an error signal (ERR) when the leading edge of the sheet detected by the leading edge detecting section 63 falls out of a predetermined region. Similarly, the side edge error detecting section 69 generates an error signal (ERR) when the side edge of the sheet detected by the side edge detecting section 64 falls out of a predetermined region. The sequence termination setting section 70 has set therein a count value to terminate printing of a sheet.

Figure 11:
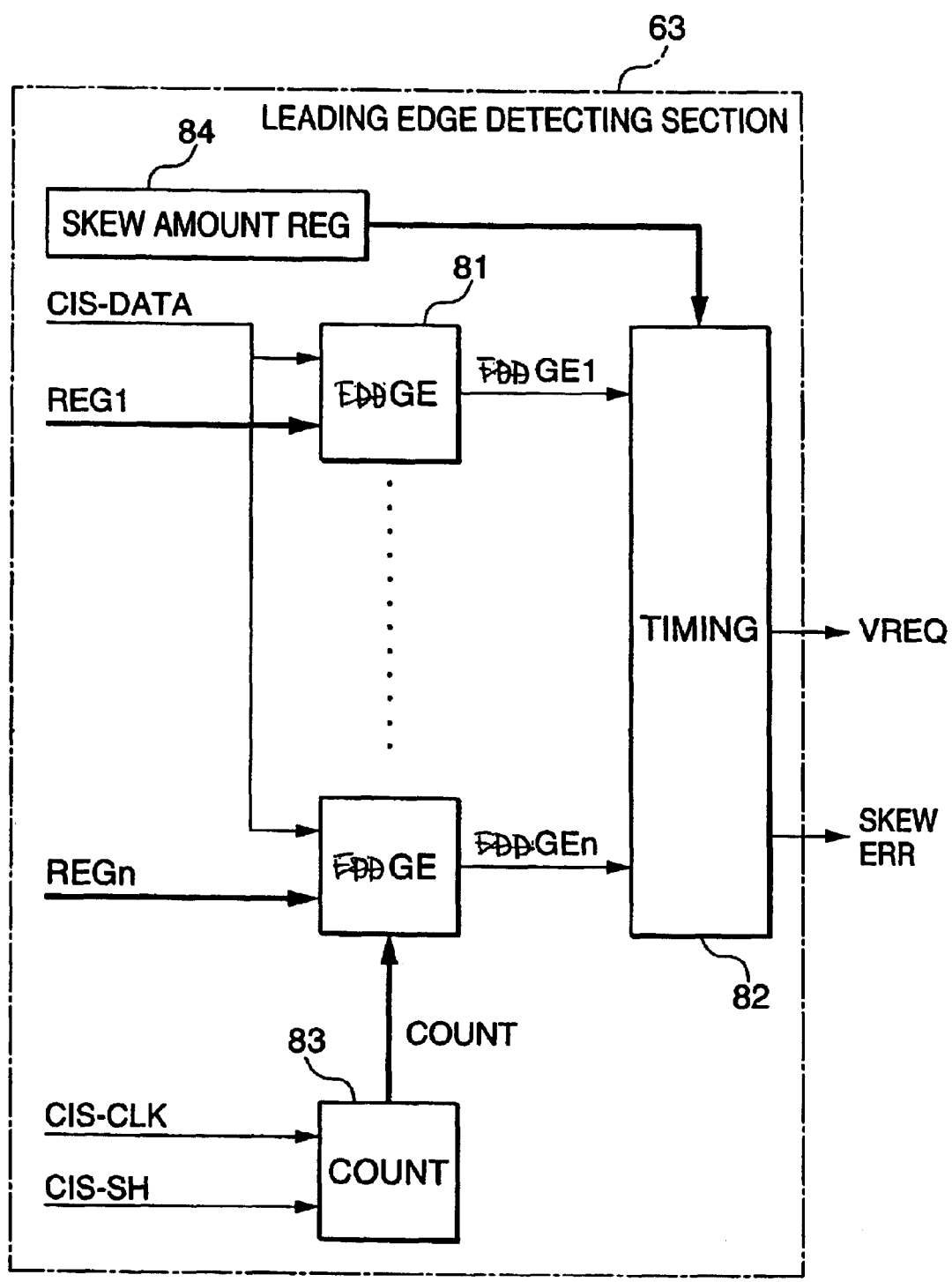
FIG. 11 is a block diagram showing the configuration of a leading edge detecting section 63.

FIG. 11 is a block diagram showing the configuration of the leading edge detecting section 63. The leading edge detecting section 63 is comprised of a plurality of edge circuits (EDGEs) 81, a timing generating circuit 82, a counter 83, and a skew amount setting section 84. To each edge circuit (EDGE) 81, a register signal (REG1 to REGn) that designates a pixel position in the light receiving element section 211a of the CIS 204 is input together with CIS data. When 'no sheet→sheet present' is detected at a pixel position designated in synchronism with a count signal from the counter 83, the edge circuit (EDGE) 81 generates an edge signal (EDGE 1 to n).

The timing generation circuit (TIMING) 82 carries out averaging processing of the plurality of edge signals (EDGE 1 to n) generated as described above and outputs a leading edge detection signal (VREQ). In addition, the timing generation circuit (TIMING) 82 detects the amount of skew using the above generated plurality of edge signals (EDGE 1 to n). When the detected amount of skew is greater than an amount of skew (REG) preset to the skew amount setting section 84, the timing generation circuit (TIMING) 82 outputs a skew error signal (skew ERR). Details of the detection of the amount of skew will be described later. A certain single pixel may be used in carrying out detection of the leading edge. However, in the present embodiment, a plurality of pixels are used, to thereby eliminate the effects of noise and the like. The use of a plurality of pixels for detection of the leading edge leads to improved accuracy of detection of the leading edge compared to detection by the conventional single optical sensor or mechanical sensor.

The counter 83 outputs a count signal to the plurality of edge circuits (EDGE) 81 according to the load signal (CIS-SH) and the clock (CIS-CLK).

Thus, the amount of skew of the sheet is detected based on the data that is read from the plurality of pixels and represents the leading edge of the sheet by the leading edge detecting section. Therefore, the calculation of the amount of skew of the sheet and the detection of the leading edge can be carried out at the same time, whereby the processing time can be reduced.

As a result, a skew of a sheet can be accurately detected before the image is formed on the sheet, whereby output of a sheet with an image of a low printing quality formed thereon due to skew can be avoided.

Sheet Feeding/Image Forming Sequence

Figure 12:
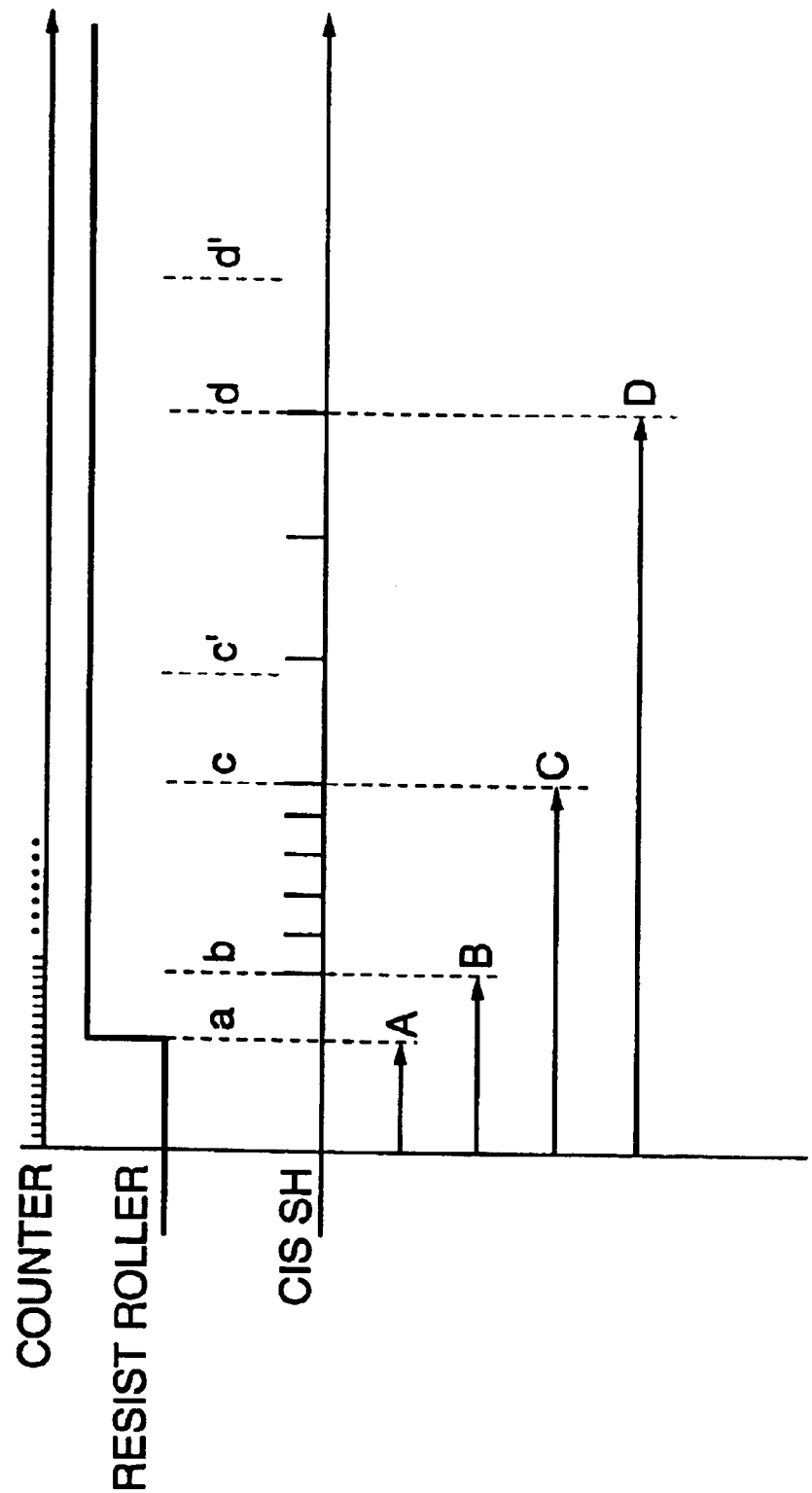
FIG. 12 is a timing chart showing the operation of the TCU 105.

FIG. 12 is a timing chart showing the operation of the TCU 105. The sheet 107 is conveyed along the sheet conveying path 205 to the resist roller 203, and while the sheet 107 stays at the resist roller 203, the sheet feeding/image forming sequence according to the present embodiment is started. When a sequence start signal (SEQSTART) is input to the counter 61, the counter 61 starts counting a clock having a fixed period. When the count value of the counter 61 indicates a timing a, the resist ON section 62 sets the resist signal to a high level H to turn the resist roller 203 on to be driven.

When the count value indicates a timing b, the operation of the CIS 204 is started in the leading edge detection mode. In the leading edge detection mode, the TCU 105 outputs the load signal (CIS-SH) with the short period TS set by the short period setting section 66 for CIS leading edge detection, to the CIS 204. Accordingly, the leading edge detecting section 63 reads only CIS data from the light receiving element section 211a in the CIS 204.

When the count value indicates a timing c and the leading edge of the sheet is detected, the leading edge detecting section 63 outputs a leading edge detection signal VREQ to the CIS controller 65, and causes the operation of of the CIS 204 to be started in the side edge detection mode. When the CIS controller 65 outputs a vertical synchronizing signal VSYNC according to the leading edge detection signal VREQ, to the laser control circuit 127, the laser control circuit 127 adjusts the writing start position by the laser beam in the subscanning direction in consideration of a margin in the vertical direction, based on the vertical synchronizing signal VSYNC from the CIS controller 65.

Figure 13:
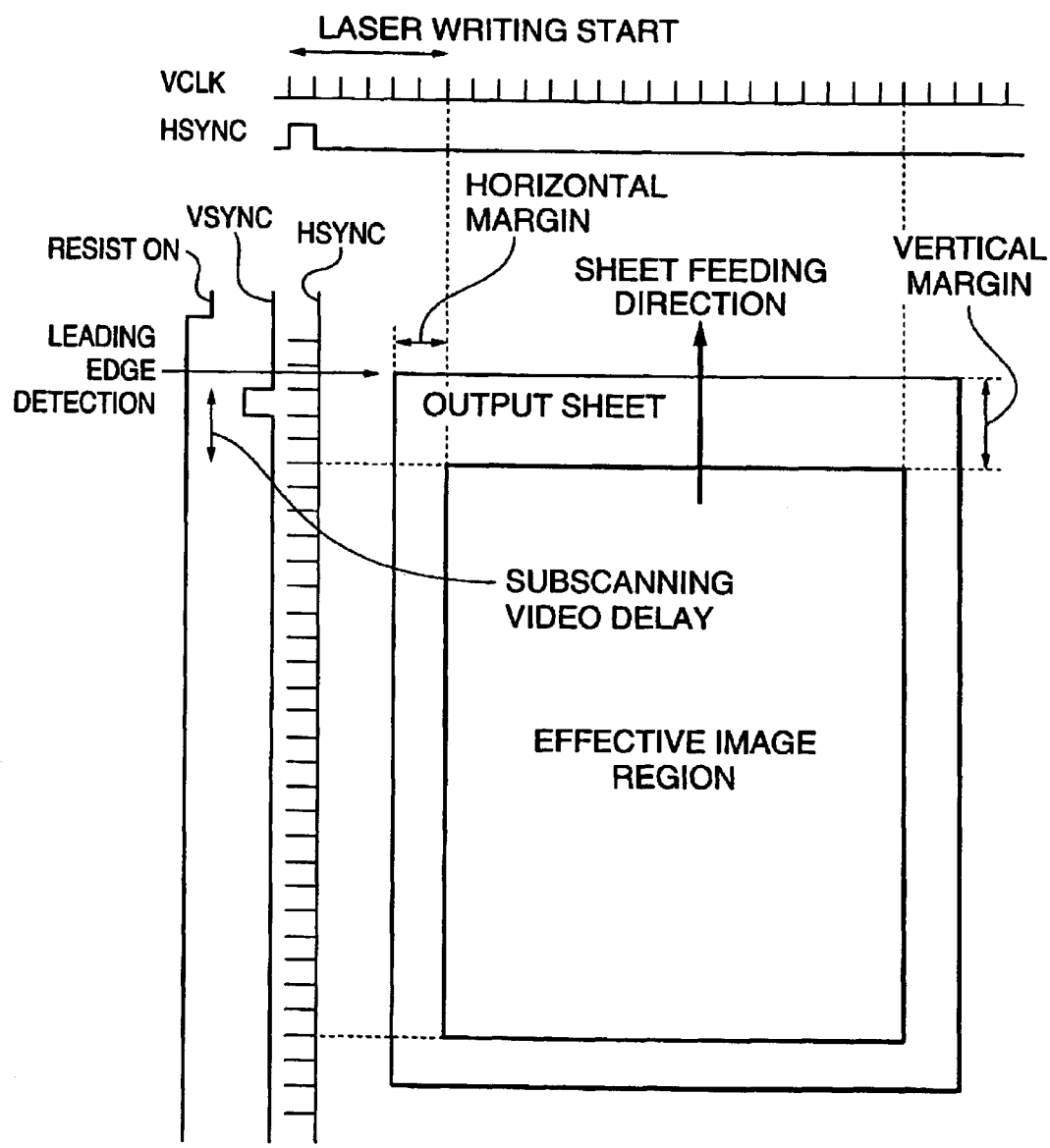
FIG. 13 is a diagram showing a manner of adjustment of a writing start position by a laser beam.

FIG. 13 is a diagram showing the manner of adjustment of the writing start position by the laser beam. If the leading edge of the sheet is not detected even when the count value becomes a timing c' (c'>c), then the CIS controller 65 outputs a leading edge error signal (leading edge ERR).

In the side edge detection mode, the TCU 105 outputs the load signal (CIS-SH) with the long period TL set by the long period setting section 68 for CIS side edge detection. Thus, the side edge detecting section 64 reads only CIS data from the light receiving element sections 212a to 217a in the specific regions in the CIS 204.

When the count value indicates a timing d and the side edge of the sheet is detected, the CIS controller 65 stops the operation of the CIS 204 and outputs a horizontal synchronizing signal HSYNC and the clock VCLK to the laser control circuit 127. The laser control circuit 127 sets the writing start position by the laser beam in the main scanning direction, based on the horizontal synchronizing signal HSYNC and the clock VCLK (see FIG. 13). If the side edge position is not detected even when the count value becomes a timing d' (d'>d), then a side edge error signal (side edge ERR) is output.

Detection of Skew

Next, a description will be given of the case where detection of the amount of skew is carried out at the same time as detection of the leading edge of the sheet conveyed by the CIS 204. In the detection of the amount of skew, only the light receiving element section 211a in one chip of the CIS 204 is used similarly to the detection of the leading edge of the sheet. In other words, out of the 7000 pixels included in the entire detection region of the CIS 204, 1000 pixels in a specific region are used to carry out the detection of the amount of skew is carried out together with the detection of the leading edge. Hereinafter, such amount of skew obtained by detection of the leading edge will be referred to as "the amount of leading edge skew".

Figure 14:
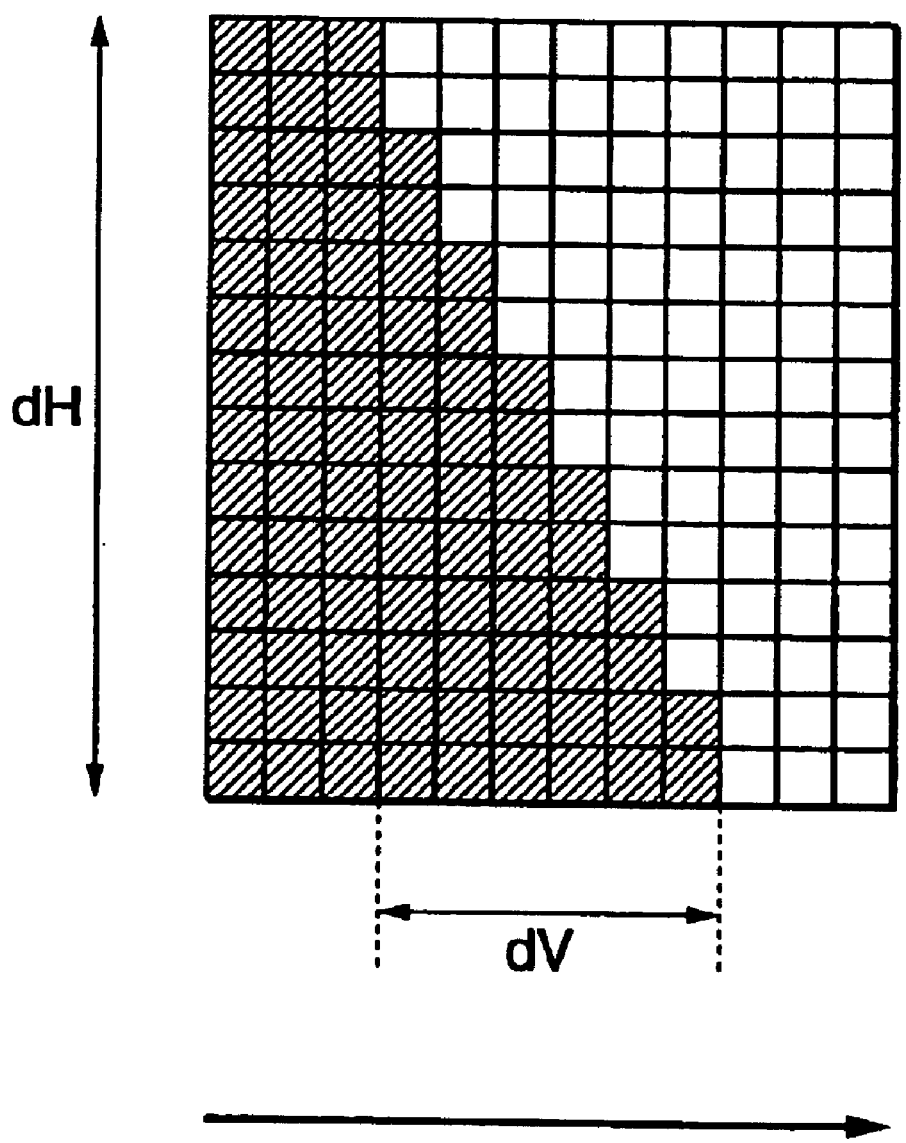
FIG. 14 is a diagram showing an amount of leading edge skew obtained from an image read by detection of the leading edge by the CIS 204.

FIG. 14 is a diagram showing the amount of leading edge skew obtained from a read image with the detection of the leading edge by the CIS 204. In the figure, the abscissa indicates the conveying distance in the subscanning direction, and the ordinate indicates the arrangement of pixels in the main scanning direction. Each of read images divided by a lattice represents the average value of an image read from read pixels in an arbitrary number (for example, 10 to 100 pixels). In the figure, the shaded image part means an area where the sheet has been read. The gradient of the boundary between the shaded image part and the non-shaded image part indicates the amount of skew whose value is represented by dH/dV.

If the CIS 204 is mounted such that the read pixels are arranged exactly in the width direction, that is, in the direction perpendicular to the sheet feeding direction, then the calculated amount of leading edge skew is equal to the amount of skew of the sheet. However, actually, the CIS 204 is not always mounted correctly. When the arrangement of the read pixels deviates even slightly from the width direction, then a correction for the deviation has to be carried out to thereby calculate the amount of leading edge skew. Therefore, according to the present embodiment, the detection of the side edge of the sheet is carried out at least at two positions of the sheet, and it is assumed that the amount of skew (amount of side edge skew) calculated according to the detections of the side edge is the correct amount of skew of the sheet, the amount of leading edge skew is corrected according to the calculated amount of side edge skew. The correction value used for the correction of the amount of leading edge skew is applied to subsequent calculations of the amount of leading edge skew by detection of the leading edge, and the correct amount of skew of the sheet is calculated only with the thus calculated amount of leading edge skew by detection of the leading edge.

Figure 15:
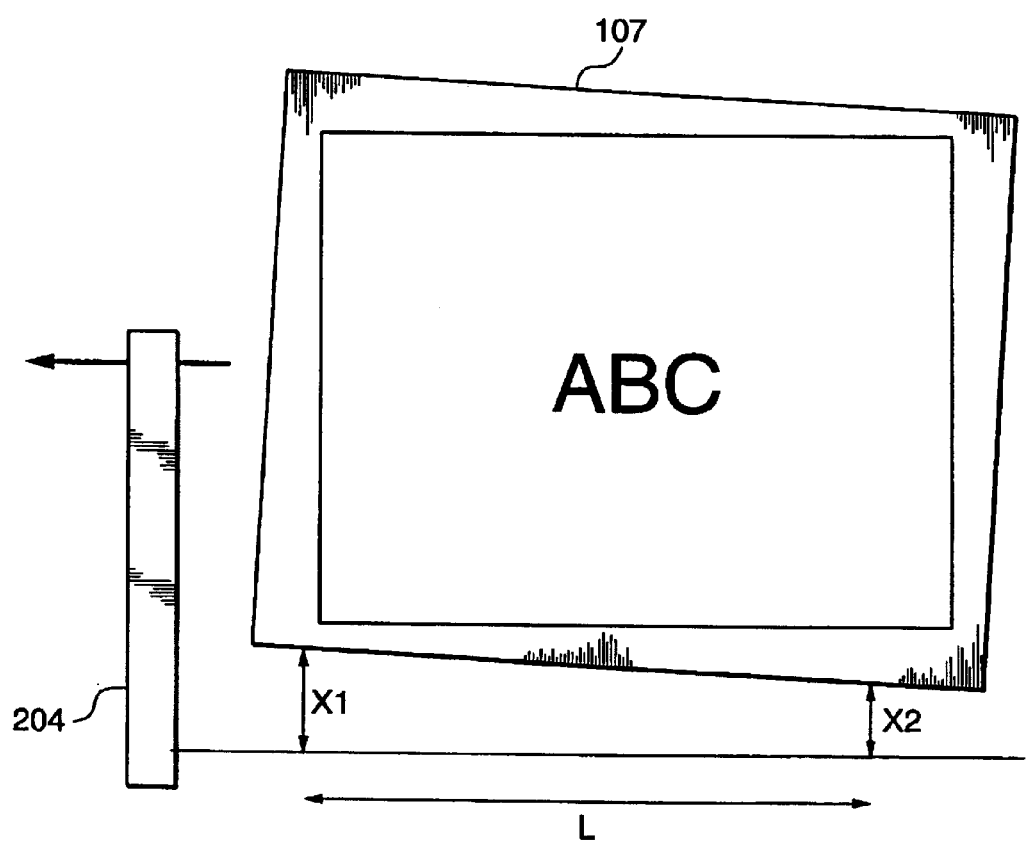
FIG. 15 is a diagram showing an amount of side edge skew obtained by detection of the side edge by the CIS 204.

FIG. 15 is a diagram showing the amount of side edge skew obtained by detection of the side edge by the CIS 204. At least two side edge positions of the sheet are detected through detection of the side edge of the sheet. Then, the amount of side edge skew is represented by (X1-X2)/L, where X1 and X2 represent the side edge positions, and L represents the conveyance distance between the two positions of the sheet detected through the detection of the side edge of the sheet.

Using this amount of side edge skew, the correction value for the amount of leading edge skew for the mounting angle error of the CIS is calculated. When the calculated mounting angle error is greater than a predetermined value, the mounting of the CIS is adjusted again. That is, the detection of the amount of skew is carried out during adjustment of the mounting angle of the CIS or in an adjusting mode.

After the mounting angle of the CIS is thus adjusted, if the corrected amount of leading edge skew obtained by the detection of the leading edge of the sheet exceeds a predetermined amount, then warning is given to the operator, and the image forming operation is stopped.

Figure 16:
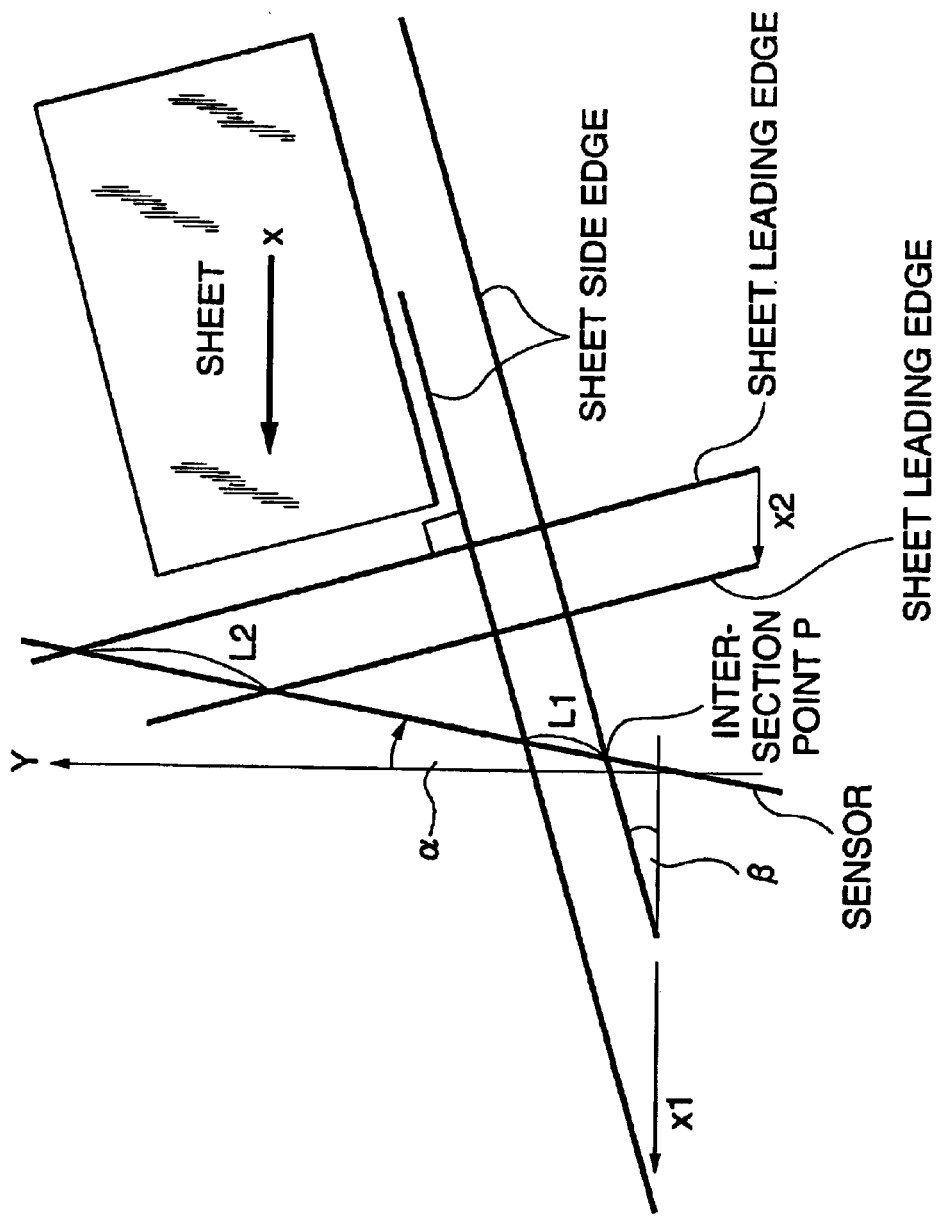
FIG. 16 is a diagram showing a manner of correction of the amount of leading edge skew.

Next, the correction of the amount of leading edge skew using the amount of side edge skew will be discussed. FIG. 16 is a diagram showing the manner of correction of the amount of leading edge skew. In the figure, the sheet is conveyed in the x axis direction. A description will now be given of a method of determining the amount of skew of the sheet in the case where the CIS is mounted with a deviation by an angle $\alpha$ with respect to the y axis and the sheet has a skew angle $\beta$:

(1) When conveying the sheet, a side edge skew determining amount $\beta1$ and a leading edge skew determining amount $\beta2$ are measured, and based on the obtained values $\beta1$ and $\beta2$, the mounting angle $\alpha1$ of the CIS is calculated. Thereafter, the calculated mounting angle $\alpha1$ is adopted as the correction value.

(2) When conveying the sheet, a leading edge skew determining amount $\gamma1$ is measured, and an accurate amount of skew $\gamma2$ is induced through calculations based on the measured value $\gamma1$ and the correction value $\alpha1$.

(3) When the mounting angle $\alpha$ of the CIS is small enough, the value $\beta1$ is almost equal to the value $\beta$, and the value $\beta2$ is almost equal to a value $\alpha+\beta$. Therefore, by measuring the values $\beta1$ and $\beta2$, the value $\alpha1$ obtained by calculation is almost equal to the gradient a of the CIS. Thus, subsequent detections of the gradient $\gamma$ of the sheet can be carried out only by the detection of the leading edge.

The above procedures (1) to (3) will be described more in detail below.

Determination of Amount of Skew by Side Edge

Figure 17:
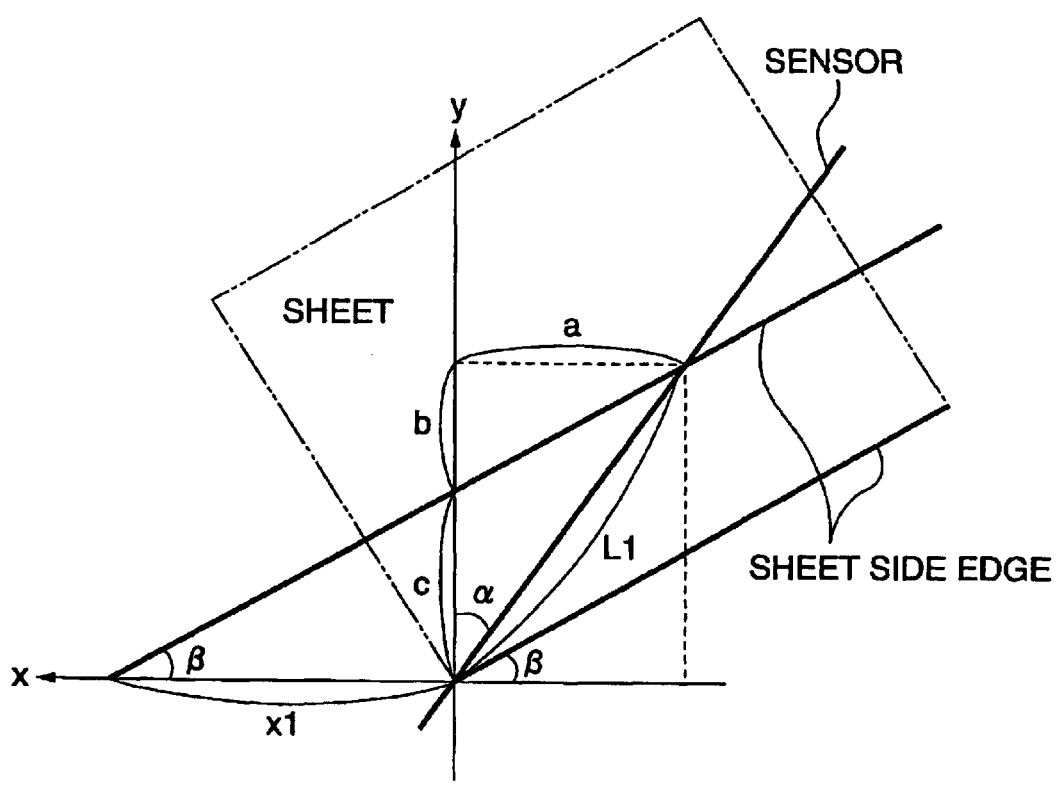
FIG. 17 is a diagram showing a manner of determination of the amount of skew detected by the CIS (sensor) mounted with a deviation by an angle $\alpha$, when a sheet moves a distance x1 with a skew angle $\beta$.

FIG. 17 is a diagram showing the manner of determination of the amount of skew detected by the CIS (sensor) mounted with a deviation by a gradient angle $\alpha$ in the case that a sheet having a skew angle $\beta$ moves the distance x1. The true value of the amount of skew by the side edge is expressed as $\tan(\beta)=c/x1$. However, an error occurs in the detected amount due to the deviation of the sensor by the angle $\alpha$, and thus the value is considered to be expressed as $\tan(\beta1)=L1/x1$. Here, it will be proved by calculation that the value $\beta1$ is almost equal to the value $\beta$, as follows.

In FIG. 17, if auxiliary lines are drawn from the intersection point of the x axis and the y axis in parallel with the x axis and the y axis, and the lengths of the auxiliary lines are designated by a, b, and c, the following expressions will be satisfied:

$\sin(\alpha)=a/L1$ $\cos(\alpha)=(b+c)/L1$ $\tan(\beta)=(b+c)/(x1+a)$

The expressions can be transformed into Expression (1) that expresses the tangent of the amount of skew $\beta1$ detected by the sensor:

$$\tan(\beta1)=\sin(\beta)/\cos(\alpha+\beta) \qquad (1)$$

FIG. 18 is a view showing a table of values of $\beta1$ obtained by an expression (1) with variables $\alpha$ and $\beta$. FIG. 19 is a view showing a table of errors in the value $\beta1$ obtained by the ratio of the value $\beta1$ to the actual value $\beta$, the errors being shown in percentage. It will be learned from FIG. 19 that when the sensor mounting error is equal to or less than 5 degrees and the amount of skew of the sheet is equal to or less than 4 degrees, the detection error is equal to or less than 1%.

Determination of Amount of Skew by Leading Edge

Figure 20:
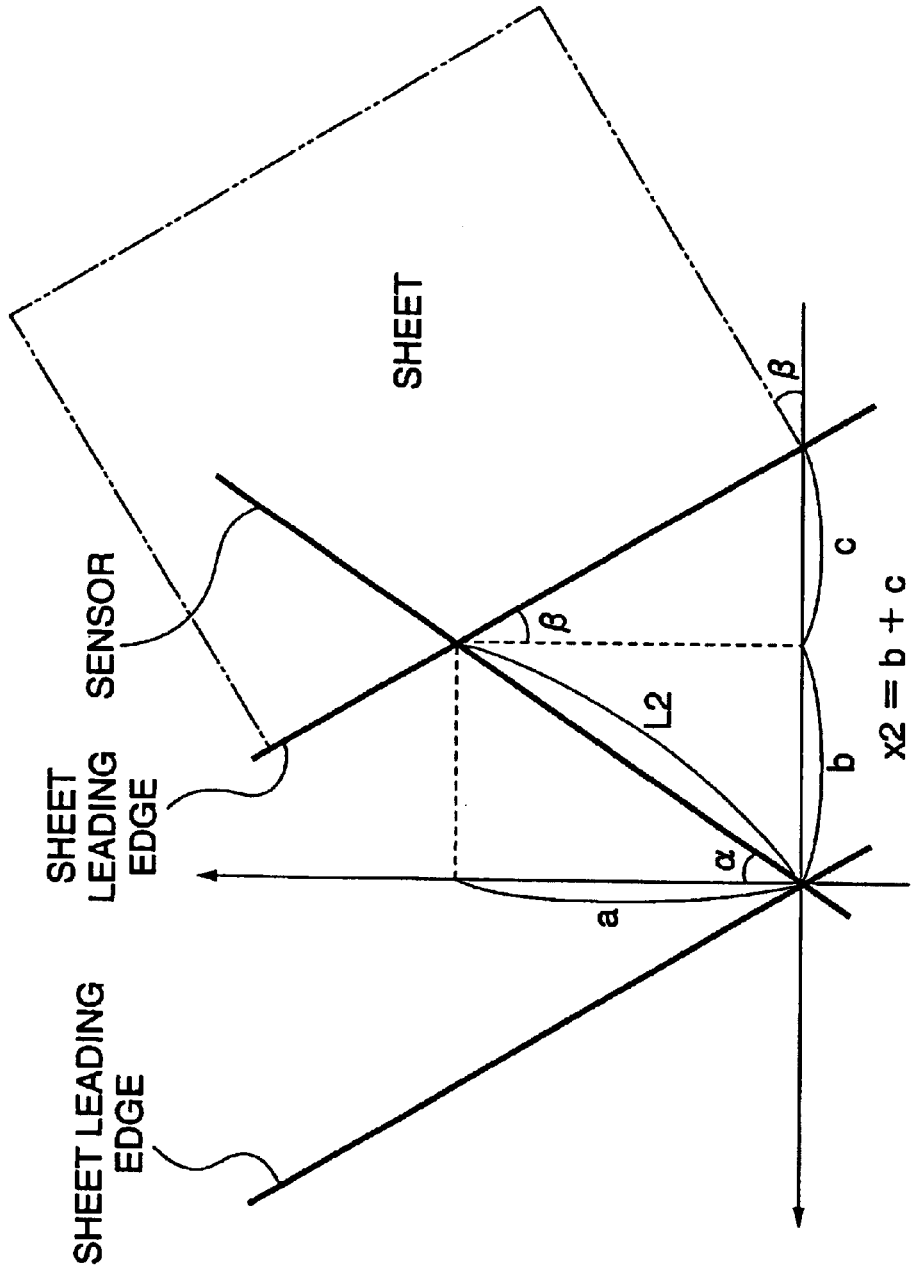
FIG. 20 is a diagram showing a manner of determination of the amount of skew at the leading edge.
Figure 26:
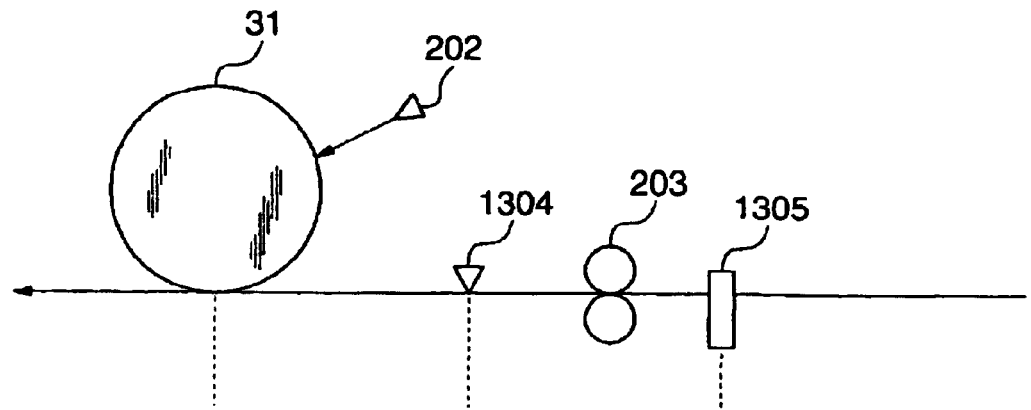
FIG. 26 is a side view showing a print position adjusting mechanism in a conventional image forming apparatus.
Figure 27:
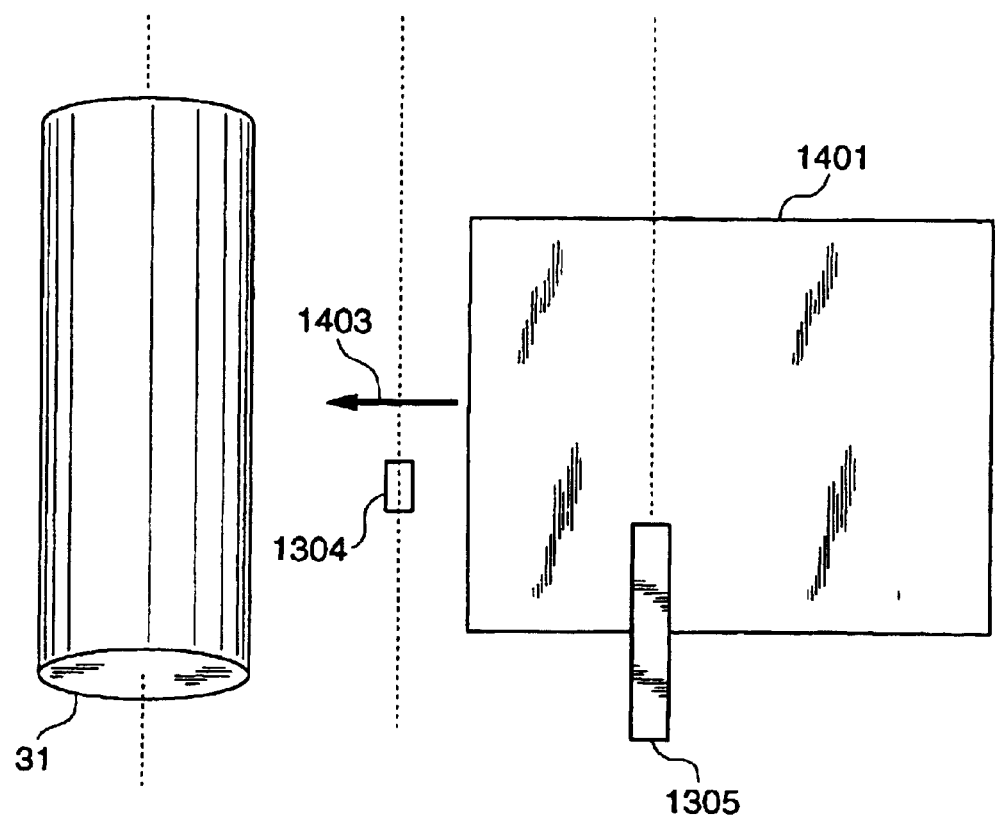
FIG. 27 is a plan view showing a part of the print position adjusting mechanism in FIG. 26.

FIG. 20 is a diagram showing a manner of determination of the amount of skew at the leading edge. FIG. 20 shows how to determine the amount of skew detected by the sensor mounted with a deviation by an angle $\alpha$ when the sheet has moved a distance x2 with a skew angle $\beta$.

In the figure, the true value of the amount of skew by the side edge is expressed as $\tan(\beta)=c/a$. However, the sensor is mounted with a deviation, which causes an error in the detected amount, resulting in a determination of $\tan(\beta2)=x2/L2$. Here, it will be proved by calculation that the value $\beta2$ is a function of the values $\beta$ and $\alpha$. In FIG. 20, if auxiliary lines are drawn from the intersection point of the x axis and the y axis in parallel with the x axis and the y axis, and the lengths of the auxiliary lines are designated by a, b, and c, the following expressions will be satisfied:

$$\sin(\alpha)=b/L2$$

$$\cos(\alpha)=a/L2$$

$$\tan(\beta)=c/a$$

$$x2=b+c$$

The expressions can be transformed into Expression (2) that expresses the tangent of the amount of skew β2 detected by the sensor:

$$\tan(\beta 2)=\sin(\alpha+\beta)/\cos(\beta) \qquad (2)$$

FIG. 21 is a view showing a table of values of the amount of skew β2 obtained by the detection of the leading edge obtained by Expression (2) with variables of α and β.

Calculation of Correction Value α1

The deviation α of the sensor is calculated as α1 from the measured values β1 and β2 under the following assumptions 1 and 2:

(Assumption 1) β1 is equal to β; and (Assumption 2) β2 is represented by Expression (2).

That is, the value β1 is substituted for β in Expression (2), into Expression (3) to obtain α1:

$$\tan(\beta 2)=\sin(\alpha 1+\beta 1)/\cos(\beta 1) \qquad (3)$$

Since the values β1 and β2 are known as the amounts of skew obtained by detections of the edges, the value α1 is obtained by Expression (4):

$$\alpha 1=asin(\cos(\beta 1)*\tan(\beta 2)-\beta 1) \qquad (4)$$

FIG. 22 is a view showing a table of values of α1 obtained by Expression (4) with variables α and β.

FIG. 23 is a view showing a table of errors in the value α1 obtained by the ratio of the value α1 to the actual value α, the errors being shown in percentage.

Thus, the mounting error of the sensor can be obtained in the adjustment mode or the like.

Detection of Skew Using Correction Value α1

Next, a description will be given of the manner of determining the actual amount of skew γ by detection of the leading edge. The sensor deviation α is stored as the calculated value α1 in the adjustment mode as described above. Therefore, the actual amount of skew obtained by detection of the leading edge is represented by γ and the detected amount is represented by γ1.

From Expression (2), tan(γ)=sin(α1+γ1)/cos(γ1) holds, and from this equation, the value γ1 is obtained by Expression (5):

$$\gamma 1=atan((\tan(\gamma)-\sin(\alpha 1))/\cos(\alpha 1)) \qquad (5)$$

where tan(γ) represents the measured value, and the values sin(α1), cos(α1) are known from the correction value α1.

FIG. 24 is a view showing a table of amounts of skew obtained by the detection of the leading edge relative to the amount of skew β of the sheet in an adjustment mode and the sensor mounting angle of α;.

FIG. 25 is a view showing a table of errors from the theoretical values in FIG. 24, the errors being shown in percentage.

It will be learned from the table of FIG. 25 that the greater the sensor mounting angle and the amount of skew of the sheet in the adjustment mode, the greater the final error. In other words, the following operation is carried out in the adjustment mode in a manner dependent upon the required accuracy of the amount of skew. More specifically, when the sensor mounting angle is determined to be equal to or more than a predetermined angle, the mounting of the sensor itself is adjusted, and when the amount of skew of the sheet is determined to be equal to or more than a predetermined amount, the adjustment mode operation is carried out again.

According to the present embodiment, as described above, the amount of side edge skew of a sheet being fed is obtained from at least two side edge positions of the sheet detected by the side edge detecting section, and the amount of leading edge skew detected by the leading edge skew amount detecting section is corrected, which further improves the detection accuracy of the amount of skew.

An embodiment according to the present invention has been described above. However, the invention is not limited to this embodiment, and is applicable to any configuration that achieves functions described in the claims or functions possessed by the above described embodiment.

For example, although in the above described embodiment, the timing of image formation in the subscanning direction is obtained by detection of the leading edge of a sheet using a CIS, alternatively the timing of image formation in the subscanning direction may be obtained by trailing edge detection of the sheet using a CIS instead of detection of the leading edge, depending on the configuration of the apparatus.

Further, although in the above described embodiment, the entire detection region of the CIS is divided in 1:6 to be used as the leading edge (skew) detection region and the side edge detecting region respectively, this division is arbitrary. Instead of dividing the entire detection region, it is also possible to use the entire detection region for detection of the side edge and use a partial detection region for detection of the leading edge (skew).

Still further, the sheet feeding/image forming sequence described above is implemented by a hardware circuit, however, it may be realized by software control with execution of a program by a CPU, instead of a hardware circuit.

What is claimed is:

1. An image forming apparatus comprising:

an image forming section that forms an image of an original on a sheet;

a resist roller that conveys the sheet to said image forming section in predetermined timing;

a sheet reading section having a plurality of read pixels for reading an image of the sheet and disposed in an area which the sheet passes, between said image forming section and said resist roller in such a fashion that the plurality of read pixels are arranged in a direction perpendicular to a direction in which the sheet is fed;

a leading edge detecting section that detects a leading edge of the sheet by repeatedly reading the plurality of read pixels with a predetermined period; and a start time determining section that determines timing for starting image formation by said image forming section, based on the leading edge of the sheet detected by said leading edge detecting section.

2. An image forming apparatus according to claim 1, wherein said leading edge detecting section repeatedly reads a part of the plurality of read pixels.

3. An image forming apparatus according to claim 1, wherein said sheet reading section has a read width not less than ½ of a difference between a maximum sheet width that can be used with said image forming section and a minimum sheet width that can be used with said image forming section.

4. An image forming apparatus comprising:
an image forming section that forms an image of an original on a sheet;
a resist roller that conveys the sheet to said image forming section in predetermined timing;
a sheet reading section having a plurality of read pixels for reading the image of the sheet and disposed in an area which the sheet passes, in a such a fashion that the plurality of read pixels are arranged in a direction perpendicular to a direction in which the sheet is fed;
a leading edge detecting section that detects a leading edge of the sheet by repeatedly reading the plurality of read pixels with a predetermined period;
a start time determining section that is responsive to the leading edge of the sheet being detected by said leading edge detecting section, for determining timing for starting image formation in the direction in which the sheet is fed by said image forming section;
a side edge detecting section that detects a side edge of the sheet by repeatedly reading the plurality of read pixels read by said leading edge detecting section; and
a writing start position adjusting section that adjusts a writing start position in which the image of the original is written by said image forming section in the direction perpendicular to the direction in which the sheet is fed, based on the side edge of the sheet detected by said side edge detecting section.

5. An image forming apparatus according to claim 4, wherein said leading edge detecting section repeatedly reads a part of the plurality of read pixels.

6. An image forming apparatus according to claim 4, wherein said side edge detecting section repeatedly reads the plurality of read pixel with a period longer than the predetermined period.

7. An image forming apparatus according to claim 4, wherein the detection of the side edge of the sheet by said side edge detecting section is carried out after the detection of the leading edge of the sheet by said leading edge detecting section.

8. An image forming apparatus according to claim 4, wherein said sheet reading section has a read width not less than ½ of a difference between a maximum sheet width that can be used with said image forming section and a minimum sheet width that can be used with said image forming section.

9. An image forming apparatus according to claim 4, further comprising a leading edge skew amount detecting section that detects an amount of skew of the leading edge of the sheet, based on data representative of the leading edge of the sheet detected by said leading edge detecting section.

10. An image forming apparatus according to claim 9, further comprising:
a side edge skew amount detecting section that detects an amount of skew of the side edge of the sheet, based on the side edge of the sheet at least two positions thereof detected by said side edge detecting section; and
a leading edge skew amount correcting section that corrects the amount of skew of the leading edge detected by said leading edge skew amount detecting section, based on the detected amount of skew of the side edge detected by said side edge skew amount detecting section.

11. An image forming apparatus, according to claim 4, wherein said image forming section comprises an original reading section that reads the image of the original, a laser device that irradiates a laser beam, an image carrier that has formed thereon a latent image of the image of the original read by said original reading section by the laser beam irradiated by said laser device, and a developing section that develops the latent image formed on said image carrier and transfers the developed latent image onto the sheet, and wherein said start time determining section determines timing for starting irradiation by the laser beam onto said image carrier in the direction in which the sheet is fed.

12. An image forming apparatus according to claim 11, wherein a distance between said sheet reading section and a transfer position in which the latent image is transferred onto the sheet by said developing section is at least equal to a sum of a distance around a periphery of said image carrier between a position of said image carrier in which the laser beam is irradiated by said laser device and the transfer position and a distance corresponding to a period of time from start of reading the sheet by said sheet reading section to determination of the timing for starting irradiation by said start time determining section.

13. An image forming apparatus according to claim 4, wherein said sheet reading section is disposed between said image forming section and said resist roller.

14. An image forming apparatus according to claim 11, wherein said image forming section comprises an original reading section that reads the image of the original, a laser device that irradiates a laser beam, an image carrier that has formed thereon a latent image of the image of the original read by said original reading section by the laser beam irradiated by said laser device, and a developing section that develops the latent image formed on said image carrier and transfers the developed latent image onto the sheet, wherein said start time determining section determines timing for starting irradiation by the laser beam onto said image carrier in the direction in which the sheet is fed, and wherein said writing start position adjusting section sets as the writing start position a position of said image carrier in which the laser beam starts to be irradiated by said laser device in the direction perpendicular to the direction in which the sheet is fed.

15. An image forming apparatus according to claim 14, wherein a distance between said sheet reading section and a transfer position in which the latent image is transferred onto the sheet by said developing section is at least equal to a sum of a distance around a periphery of said image carrier between a position of said image carrier in which the laser beam is irradiated by said laser device and the transfer position and a distance corresponding to a period of time from start of reading the sheet by said sheet reading section to determination of the timing for starting irradiation by said start time determining section and setting of the writing start position by said writing start position adjusting section.

16. An image formation control method for an image forming apparatus comprising an image forming section that forms an image of an original on a sheet, a resist roller that conveys the sheet to said image forming section in predetermined timing, a sheet reading section having a plurality of read pixels for reading an image of the sheet, the method comprising the steps of:
disposing the sheet reading section in an area which the sheet passes, between said image forming section and said resist roller in such a fashion that the plurality of read pixels are arranged in a direction perpendicular to a direction in which the sheet is fed;
detecting a leading edge of the sheet by repeatedly reading the plurality of read pixels with a predetermined period; and determining timing for starting image formation by said image forming section, based on the leading edge of the sheet detected in said leading edge detecting step.

17. An image formation control method according to claim 16, wherein in said leading edge detecting step, a part of the plurality of read pixels is repeatedly read.

18. An image formation control method for an image forming apparatus comprising an image forming section that forms an image of an original on a sheet, a resist roller that conveys the sheet to said image forming section in predetermined timing, a sheet reading section having a plurality of read pixels for reading an image of the sheet, the method comprising the steps of:

disposing the sheet reading section in an area which the sheet passes, between said image forming section and said resist roller in such a fashion that the plurality of read pixels are arranged in a direction perpendicular to a direction in which the sheet is fed;

detecting a leading edge of the sheet by repeatedly reading the plurality of read pixels with a predetermined period;

determining timing for starting image formation by said image forming section, based on the leading edge of the sheet detected in said leading edge detecting step;

detecting a side edge of the sheet by repeatedly reading the plurality of the read pixels read in said leading edge detecting step; and adjusting a start position of writing the image of the original in the direction perpendicular to the direction in which the sheet is fed, based on the detected side edge of the sheet.

19. An image formation control method according to claim 18, wherein in said leading edge detecting step, a part of the plurality of read pixels is repeatedly read.

20. An image formation control method according to claim 18, wherein in said side edge detecting step, the plurality of read pixels are repeatedly read with a period longer than the predetermined period.

21. An image formation control method according to claim 18, wherein said side edge detecting step is executed after execution of said leading edge detecting step.

22. An image formation control method according to claim 18, further comprising a step of detecting an amount of skew of the leading edge of the sheet, based on data representative of the leading edge of the sheet read from a part of the plurality of read pixels in said leading edge detecting step.

23. An image formation control method according to claim 22, further comprising the steps of:

detecting an amount of skew of the side edge of the sheet, based on the side edge of the sheet at least two positions thereof detected in said side edge detecting step; and correcting an amount of skew of the leading edge of the sheet detected in said leading edge skew amount detecting step, based on the detected amount of skew of the side edge of the sheet.

24. An image formation control method according to claim 18, further comprising the steps of reading the image of the original, forming a latent image on an image carrier, based on the read image by irradiating a laser beam onto the image carrier, developing the latent image, and transferring the developed image onto the sheet, and wherein said image formation starting timing determining step comprises determining dining for starting irradiation of the laser beam in said latent forming step.

25. An image formation control method according to claim 18, further comprising the steps of reading the image of the original, forming a latent image on an image carrier, based on the read image by irradiating a laser beam from a laser device onto the image carrier, developing the latent image, and transferring the developed image onto the sheet, and wherein said image formation starting timing determining step comprises determining timing for starting irradiation of the laser beam in said latent forming step, and wherein said writing start position adjusting step comprises setting as the writing start position a position of said image carrier in which the laser beam starts to be irradiated by said laser device in the direction perpendicular to the direction in which the sheet is fed.

* * * * *